US012743960B2

(12) United States Patent
Shapira et al.

(10) Patent No.: US 12,743,960 B2
(45) Date of Patent: *Sep. 22, 2026

(54) SYSTEMS AND METHODS FOR MANAGING UNMANNED VEHICLE INTERACTIONS WITH VARIOUS PAYLOADS

(71) Applicant: XTEND REALITY EXPANSION LTD., Tel Aviv (IL)

(72) Inventors: Aviv Shapira, Tel Aviv (IL); Reuven Rubi Liani, Rosh Haayin (IL); Vittorio Zaidman, Rehovot (IL); Erez Nehama, Ramat Gan (IL); Natan Colletti, Tel Aviv (IL); Max Zemsky, Petah Tikva (IL)

(73) Assignee: XTEND REALITY EXPANSION LTD., Tel Aviv (IL)

( * ) Notice: Subject to any disclaimer, the term of this patent is extended or adjusted under 35 U.S.C. 154(b) by 77 days.

This patent is subject to a terminal disclaimer.

(21) Appl. No.: 18/306,277

(22) Filed: Apr. 25, 2023

(65) Prior Publication Data

US 2023/0343229 A1 Oct. 26, 2023

Related U.S. Application Data

(63) Continuation-in-part of application No. 18/181,780, filed on Mar. 10, 2023, which is a (Continued)

(51) Int. Cl.

| | |
|---|---|
| ***G08G 5/55*** | (2025.01) |
| ***G08G 5/30*** | (2025.01) |
| ***G08G 5/57*** | (2025.01) |

(52) U.S. Cl.

CPC ................. *G08G 5/55* (2025.01); *G08G 5/30* (2025.01); *G08G 5/57* (2025.01)

(58) Field of Classification Search

CPC .. G08G 5/55; G08G 5/30; G08G 5/57; H10H 29/922; H10D 84/0126; H10D 62/13

See application file for complete search history.

(56) References Cited

U.S. PATENT DOCUMENTS

2012/0043411 A1* 2/2012 Beck ........................ F41F 3/042 102/374
2016/0009392 A1* 1/2016 Korhonen ................ B64D 1/08 244/137.3

(Continued)

OTHER PUBLICATIONS

Ippolito, Corey, et al., "Applications of Payload Directed Flight," Apr. 24, 2009, IEEE, 2009 IEEE Aerospace conference, pp. 1-15 (Year: 2009).*

*Primary Examiner* — Madison R. Inserra
(74) *Attorney, Agent, or Firm* — NIXON & VANDERHYE

(57) ABSTRACT

Embodiments of the present disclosure may include a method for improving, or even optimizing, flight of an unmanned aerial vehicle (UAV) including a payload, the method including receiving one or more human-initiated flight instructions. Embodiments may also include determining a UAV context based at least in part on Inertial Measurement Unit (IMU) data from the UAV. Embodiments may also include receiving payload-identification data. Embodiments may also include accessing a laden-flight profile based at least in part on the payload-identification data. Embodiments may also include determining one or more laden-flight parameters. In some embodiments, the one or more laden-flight parameters may be based at least in part on the one or more human-initiated flight instructions, the UAV context, and the laden-flight profile.

7 Claims, 18 Drawing Sheets

Related U.S. Application Data continuation-in-part of application No. PCT/IL2022/051286, filed on Dec. 2, 2022.

(60) Provisional application No. 63/334,222, filed on Apr. 25, 2022.

(56) References Cited

U.S. PATENT DOCUMENTS

| | | | | |
|---|---|---|---|---|
| 2018/0257779 | A1* | 9/2018 | Shannon | B64D 1/22 |
| 2019/0088156 | A1* | 3/2019 | Choi | G06T 11/60 |
| 2019/0389577 | A1* | 12/2019 | Jones | G05D 1/0094 |
| 2023/0109390 | A1* | 4/2023 | Wang | G08G 5/34<br>701/120 |
| 2025/0028335 | A1* | 1/2025 | Liani | G05D 1/656 |

* cited by examiner

SYSTEMS AND METHODS FOR MANAGING UNMANNED VEHICLE INTERACTIONS WITH VARIOUS PAYLOADS

This application claims priority of U.S. provisional patent application Ser. No. 63/334,222, titled SYSTEMS AND METHODS FOR UNMANNED AERIAL VEHICLE INTERACTIVITY WITH VARIOUS PAYLOADS AND VARIOUS PAYLOAD TYPES, filed Apr. 25, 2022, claims priority as a continuation-in-part of U.S. patent application Ser. No. 18/181,780, titled SYSTEMS AND METHODS FOR MANAGING UNMANNED VEHICLE INTERACTIONS WITH VARIOUS PAYLOADS, filed Mar. 10, 2023, and claims priority as a continuation-in-part of PCT application. Ser. No PCT/IL2022/051286, titled SYSTEMS AND METHODS FOR UNMANNED AERIAL VEHICLE INTERACTIVITY WITH VARIOUS PAYLOADS AND VARIOUS PAYLOAD TYPES, filed Dec. 2, 2022, each of the contents are incorporated in their entirety by this reference.

FIELD OF THE DISCLOSURE

The present patent application relates to extensible unmanned vehicle systems and methods for dynamically adjusting to a variety of payloads and payload types for improved to optimized pilot performance with unmanned vehicles and payload operation or deployment.

SUMMARY

Embodiments of the present disclosure include attachment, communications, power management, and other mechanisms for transmitting and receiving payload identification data, flight data, or other information between a UAV and a payload. In some embodiments, a UAV microprocessor-based controller may be configured to receive information from a payload and configured to provide control signals for the UAV based on the information from the payload. A payload adaptor such as a payload electromechanical harness, a power coupling, or a data link may be configured to couple the payload to the UAV. The payload adaptor may include a communications link between the payload and the UAV microprocessor-based controller.

One aspect of the present disclosure relates to a system configured for operating an unmanned aerial vehicle. The system may include one or more hardware processors configured by machine-readable instructions. The processor(s) may be configured to perform a testing during a take-off command and configured to monitor performance of the UAV during hovering or flight to determine a value corresponding to a mass of an attached payload. The processor(s) may also be configured to predict a flight response of the UAV to particular movements at one or more flight velocities. The processor(s) may also be configured to modify UAV commands received from a pilot using predicted flight responses to reduce toward or to zero the likelihood of the UAV engaging in unsafe maneuvers.

In some embodiments of the systems and methods, the processor(s) may be configured to acquire one or more coded or non-coded identifiers associated with the attached payload visually or over a communications link using a payload adaptor configured to couple the payload to the UAV. In some embodiments of the system, a payload adaptor may include the communications link between the payload and a UAV microprocessor-based controller. In some embodiments of the system, the processor(s) may be configured to obtain identification data indicative of at least one characteristic of the attached payload using one or more coded or non-coded identifiers associated with the attached payload. In some embodiments of the system, the processor(s) may be configured to modify UAV commands (or operational instructions) received from a pilot using the predicted flight responses and the at least one characteristic of the payload to reduce toward or to zero the likelihood of the UAV engaging in unsafe maneuvers.

In some embodiments of the system, the processor(s) may be configured to capture one or more payload images of the attached payload using the payload adaptor or an onboard imager. In some embodiments of the system, one or more images of an attached or unattached payload may be used to obtain identification data or physical dimensions indicative of at least one characteristic of the attached payload.

In some embodiments of the system, the processor(s) may be configured to interrogate the attached payload with an authentication protocol based at least in part on payload-identification data received from the attached payload.

In some embodiments of the system, payload-image data may be provided to the UAV over the communications link.

In some embodiments of the system, payload data may be transmitted to at least one ground control station.

In some embodiments of the system, at least one payload attribute may be communicated to the UAV microprocessor-based controller.

Another aspect of the present disclosure relates to a method for operating an unmanned aerial vehicle. The method may include performing calibration testing during take-off, hovering, flight, or landing. The UAV may monitor hovering or flight performance of the UAV to determine a value corresponding to a mass of an attached payload, or to determine one or more effects of the payload on flight or hovering of the UAV. The method may include predicting a flight response of the UAV to particular movements at one or more flight velocities or in one or more flight modes. The method may include modifying UAV commands received from a pilot using the predicted flight responses adapted to a flight envelope of the UAV and attached payload to reduce toward or to zero the chances that the UAV engages in unsafe maneuvers or is unable to comply with pilot commands.

Yet another aspect of the present disclosure relates to a non-transient computer-readable storage medium having instructions embodied thereon, the instructions being executable by one or more processors to perform a method for operating an unmanned aerial vehicle. The method may include performing testing during take-off, hovering, flight, or landing, and monitoring performance of the UAV to determine a value corresponding to a mass of an attached payload, or a flight profile with the payload attached. The method may include predicting a flight response of the UAV to particular movements at one or more flight velocities. The method may include modifying UAV commands received from a pilot using the predicted flight responses to reduce toward or to zero the chances that the UAV engages in unsafe maneuvers or that the UAV cannot perform as directed by the pilot.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

Embodiments of the present disclosure may include a system for operating an unmanned aerial vehicle (UAV), the system including a UAV microprocessor-based controller configured to receive information from a payload and configured to provide control signals for the UAV based on the information from the payload. Embodiments may also include a payload adaptor configured to couple the payload to the UAV, the payload adaptor including a communications link between the payload and the UAV microprocessor-based controller.

In some embodiments, the payload may be configured to provide identification data indicative of at least one characteristic of the payload over the communications link. In some embodiments, the payload may be configured to provide payload-image data to the UAV over the communications link. In some embodiments, the UAV microprocessor-based controller may be configured to capture one or more images of the payload.

In some embodiments, the UAV microprocessor-based controller may be configured to transmit data to the payload over the communications link. In some embodiments, the at least one of the UAV microprocessor-based controller or the payload may be configured to transmit payload data to at least one ground control station. In some embodiments, the communications link may include a wired communications link.

In some embodiments, the communications link may include a wireless communications link. In some embodiments, at least one of the UAV or the payload adaptor includes at least one wireless transceiver. In some embodiments, the payload adaptor may be configured to couple the UAV to a payload having no electronic communications functionality.

In some embodiments, the payload adaptor includes one or more cameras configured to communicate at least one image of the payload to the UAV microprocessor-based controller to identify the payload. In some embodiments, the payload adaptor includes at least one reader configured to acquire one or more coded or non-coded identifiers associated with the payload.

In some embodiments, the at least one reader may include at least one of an optical-character-recognition function, an RFID reader, a bar-code reader, or a QR-code reader. In some embodiments, the one or more coded or non-coded identifiers associated with the payload may include one or more of an alphanumeric string, a non-alphanumeric set of symbols, a bar code, a QR code, or an RFID signal.

In some embodiments, the payload may be configured to communicate at least one payload attribute to the UAV microprocessor-based controller. In some embodiments, the payload attribute may include one or more of a payload classification, a payload unique identifier, payload-weight data, payload-weight-distribution data, or a flight-performance model.

In some embodiments, the information from the payload may include at least one payload-specific mode. In some embodiments, the at least one payload-specific mode may include at least one of the following flight modes: a high-altitude mode, a low-altitude mode, a high-speed mode, a low-speed mode, a night mode, a day mode, a banking mode, an angle-of-attack mode, a roll mode, a yaw mode, or a Z-axis or bird's-eye-view mode.

In some embodiments, the at least one payload-specific mode may include at least one navigation mode, including at least one of a road-avoidance mode or a UAV-avoidance mode. In some embodiments, the at least one payload-specific mode may include at least one power-consumption mode, including at least one of a battery-saver mode or a speed-burst mode.

In some embodiments, the at least one payload-specific mode may include at least one virtual-reality (VR) mode, including at least one of a target-centric mode, a UAV-centric mode, a payload-centric mode, a camera-changing mode, an automatically changing view mode, a view-selection-user-interface (UI) mode, an interception mode, an end-game mode, a change-in-control-dynamics mode, a clear-display-but-for-marker mode, an edit-presets mode, or a changing-presets mode.

In some embodiments, the at least one payload-specific mode may include at least one payload-deployment mode, including at least one of a chemical, biological, radiological, or nuclear (CBRN) mode, an explosives mode, or a non-military payload-deployment mode. In some embodiments, the payload-specific mode may include at least one security mode, including at least one of an encryption/decryption mode, a data-processing-and-retransmission mode, a zero-processing-passthrough-of-packets mode, or an option-to-change-encryption-key mode.

In some embodiments, the payload-specific mode may include at least one communication mode, including at least one of a radio mode, a microwave mode, a 4G mode, or a 5G mode. In some embodiments, the payload-specific mode may include at least one defense mode, including at least one of a camouflage mode, an evasion mode, an intercept mode, a counterattack mode, or a self-destruct mode.

In some embodiments, the payload-specific mode may include at least one failure mode, including at least one of a self-destruct mode, a drop-payload mode, an abort mode, an electromagnetic-pulse mode, a user-defined mode, or a programming-state mode. Embodiments may also include an instruction for determining a drone context based at least in part on an Inertial Measurement Unit (IMU) attribute that may include gathering temporal sensor data. Embodiments may also include processing the temporal sensor data in an extended Kalman filter. Embodiments may also include calculating a fused-state estimation. Embodiments may also include transmitting the fused-state estimation to a flight controller.

Embodiments of the present disclosure may also include a system for operating an unmanned aerial vehicle (UAV), the system including a UAV microprocessor-based controller configured a) to receive information from at least one communication circuit of a payload and b) to provide control signals for the UAV based on the information. Embodiments may also include a payload adaptor including an electrical interconnect configured to couple with a payload electrical interconnect and configured to couple the payload to the UAV, the payload adaptor including a communications link from the payload to the UAV microprocessor-based controller.

In some embodiments, the payload may include data-processing electronics. In some embodiments, the data-processing electronics of the payload may be configured to receive instructions from the UAV microprocessor-based controller. In some embodiments, the payload may include a camera configured to receive operation instructions from the UAV microprocessor-based controller.

In some embodiments, the payload may include at least one non-destructive testing (NDT) sensor. In some embodiments, the at least one NDT sensor may be configured to receive commands from the UAV microprocessor-based controller. In some embodiments, the at least one NDT sensor may be configured to send collected data to the UAV microprocessor-based controller.

In some embodiments, the payload may include at least one chemical, biological, radiological, nuclear, or explosive (CBRNE) sensor. In some embodiments, the at least one CBRNE sensor may be configured to provide sensing data to the UAV microprocessor-based controller. In some embodiments, the payload may include signal-jamming electronics. In some embodiments, the signal-jamming electronics may be configured to receive commands from the UAV microprocessor-based controller.

In some embodiments, the payload adaptor may be configured to couple with a plurality of different types of payloads. In some embodiments, the UAV microprocessor-based controller may be configured to interrogate a UAV-attached payload with an authentication protocol based at least in part on payload-identification data received from the payload. In some embodiments, the UAV microprocessor-based controller may be configured to interrogate a UAV-attached payload with a verification protocol based at least in part on payload-identification data received from the payload. In some embodiments, the UAV microprocessor-based controller may be configured to confirm a mechanical connection between the UAV and an attached payload. In some embodiments, the UAV may be configured to determine at least one of a visual confirmation of the mechanical connection, an electrical confirmation of the mechanical connection, a wireless connection between the UAV and the attached payload, or a make/break connection between the UAV and the attached payload.

Embodiments of the present disclosure may also include a method for operating an unmanned aerial vehicle, the method including performing testing during a take-off period and monitoring performance of the UAV to determine a value corresponding to a mass of an attached payload. Embodiments may also include predicting a flight response of the UAV to particular movements at one or more flight velocities based on the value corresponding to the mass of the attached payload. Embodiments may also include modifying UAV commands received from a pilot using the predicted flight response to improve, or even to optimize, UAV flight performance.

Embodiments of the present disclosure may also include a method for operating an unmanned aerial vehicle, the method including receiving payload-attribute data via an adaptor between a UAV and an attached payload. Embodiments may also include performing a calibration flight of the UAV and the attached payload to generate calibration-flight data. Embodiments may also include adjusting one or more flight parameters of the UAV based at least in part on the payload-attribute data and the calibration-flight data.

Embodiments of the present disclosure may also include a non-transient computer-readable storage medium having instructions embodied thereon, the instructions being executable by one or more processors to perform a method for operating an unmanned aerial vehicle, the method including performing testing during a take-off period and monitoring performance of the UAV to determine a value corresponding to a mass of an attached payload. Embodiments may also include predicting a flight response of the UAV to particular movements at one or more flight velocities based on the value corresponding to the mass of the attached payload. Embodiments may also include modifying UAV commands received from a pilot using the predicted-flight responses to improve, or even to optimize, UAV flight performance.

Embodiments of the present disclosure may also include a system for improving, or even optimizing, flight of an unmanned aerial vehicle (UAV) including a payload, the system including a microprocessor-based controller associated with a UAV, the microprocessor-based controller including a non-transitory computer-readable storage medium having instructions stored thereon that when executed by the controller cause the controller to perform a method including determining a UAV context based at least in part on Inertial Measurement Unit (IMU) data from the UAV.

Embodiments may also include receiving payload-identification data. Embodiments may also include determining a burdened-flight profile based at least in part on the payload-identification data. Embodiments may also include determining one or more burdened-flight parameters. In some embodiments, the one or more burdened-flight parameters may be based at least in part on the UAV context and the burdened-flight profile.

In some embodiments, the instructions stored thereon that when executed by the controller cause the controller to perform a method further include receiving one or more payload-initiated flight instructions. In some embodiments, the one or more payload-initiated flight instructions include one or more of a flight-elevation instruction, a movement instruction, an acceleration instruction, a hover instruction, a banking instruction, a calibration instruction, a payload-engagement command, and a payload-disengagement command.

In some embodiments, the one or more payload-initiated flight instructions include at least one of a payload-arming command, an authentication request, or a weight-calibration command. Embodiments may also include receiving one or more payload-initiated flight instructions including receiving at least one automated command sequence. In some embodiments, the at least one automated command sequence includes one or more of an object-recognition sequence, an obstacle collision-avoidance sequence, a pedestrian collision-avoidance sequence, and an environmental collision-avoidance sequence.

In some embodiments, the automated command sequence includes one or more of a return-home command, a takeoff command, a calibration maneuver, a landing command, a payload approach, a motor-on mode, a standby mode, a breach command, skid mode, and a fly-to-waypoint command. In some embodiments, the system may include a plurality of UAVs. Embodiments may also include a ground command station (GCS). In some embodiments, the GCS may include a transceiver in communication with the plurality of UAVs. Embodiments may also include a microprocessor-based GCS controller associated with the GCS, the microprocessor-based GCS controller including a non-transitory computer-readable storage medium having instructions stored thereon that when executed by the GCS controller cause the GCS controller to perform a method including associating a set of UAVs as group members within a group membership.

Embodiments may also include designating at least one UAV from the set of UAVs as a lead UAV within the group membership. Embodiments may also include designating at least one UAV from the set of UAVs as a follower UAV within the group membership. Embodiments may also include receiving, by the GCS controller, a lead UAV flight command.

Embodiments may also include determining, by the GCS controller, at least one follower flight-path instruction for the at least one follower UAV based at least in part on the lead-UAV flight command. Embodiments may also include transmitting, by the transceiver, the at least one follower flight-path instruction to at least one follower UAV within the group membership.

In some embodiments, the UAV context may include one or more of a UAV operating status, and a system capability. In some embodiments, the UAV context may include one or more of a payload-armed status, an authentication status, a group membership, a lead-UAV status, a follower-UAV status, a mission status, a mission objective, an engagement in an automated-command status, a maintenance-alert status, a reduced operational capacity, a maximum range, and a battery-life status.

In some embodiments, the UAV context may include one or more of an indoor/outdoor flight transition, an environmental low-visibility status, a high-wind status, an air-pollutant status, a chemical-presence status, a munitions status, a high-electromagnetic-radiation alert, a humidity status, a temperature-alert status, and a detected audible alert.

In some embodiments, the UAV context may include a ground-truth reading. In some embodiments, the Inertial Measurement Unit (IMU) data may be generated by using a neural network to filter an IMU dataset. In some embodiments, the Inertial Measurement Unit (IMU) data may include linear-acceleration data and an angular-velocity data. In some embodiments, a state estimate of one or more of a position, a velocity, an orientation in a body frame, and an inertial frame of the UAV may be determined based at least in part on the linear-acceleration data and the angular-velocity data.

In some embodiments, the Inertial Measurement Unit (IMU) data may include one or more of a yaw of the UAV, a relative pose between two sequential moments, a 3D trajectory, a ground-truth linear velocity, a target-tracking command, and a predicted-linear-velocity vector (x, y, z). In some embodiments, the Inertial Measurement Unit (IMU) data may be based at least in part on data from one or more Inertial Measurement Unit (IMU) sensors.

In some embodiments, the Inertial Measurement Unit (IMU) data may be augmented with on one or more of LIDAR data, visual-odometry data, or computer-vision data. In some embodiments, the payload-identification data includes at least identification data indicative of the payload. Embodiments may also include receiving payload-identification data including, but not limited to, receiving payload-image data as the payload-identification data.

The system may include an electrical connection with the payload in some embodiments. In some embodiments, the electrical connection may be configured to allow the transmission of payload-identification data between the payload and the UAV. In some embodiments, the transmission of payload-identification data between the payload and the UAV may include at least one payload attribute.

In some embodiments, the at least one payload attribute may include one or more of a payload classification, a payload unique identifier, a payload weight distribution, and a flight-performance model. In some embodiments, the at least one payload attribute may be used to at least partially determine the burdened-flight profile.

In some embodiments, the burdened-flight profile may be determined based at least in part on one or more of dynamic payload management, payload identification, and semi-autonomous interception of a target using a queuing methodology. Embodiments may also include determining that the burdened-flight profile may be partially based on a rule set, including one or more of a recommended maximum UAV velocity. Embodiments may also include a recommended UAV acceleration. Embodiments may also include a recommended UAV deceleration. Embodiments may also include a minimum UAV turning radius.

Embodiments may also include a minimum distance from an object in a flight path. Embodiments may also include a maximum flight altitude. Embodiments may also include a formula for calculating a maximum safe distance. Embodiments may also include a maximum burdened-weight value. Embodiments may also include a maximum angle of one or more axis of an in-flight UAV command.

Embodiments may also include a monitor-and-adjust arming status. Embodiments may also include a hover travel based at least in part on an IMU or a LIDAR sensor. Embodiments may also include a coordinate of a ground command station or other UAVs. Embodiments may also include a monitor-and-adjust power-consumption mode. Embodiments may also include one or more guidelines to modify one or more pilot input parameters.

In some embodiments, the instructions stored thereon that when executed by the controller cause the controller to perform a method further including transmitting a video feed to a Visual Guidance Computer (VGC). In some embodiments, the instructions stored thereon that when executed by the controller cause the controller to perform a method further including initializing a queuing system and a visual tracker. Embodiments may also include transmitting a video feed to a Visual Guidance Computer (VGC) and the visual tracker. Embodiments may also include receiving a configuration package associated with the payload.

In some embodiments, the burdened flight profile may include one or more payload-specific modes of operation. In some embodiments, the one or more payload-specific modes of operation may include a flight mode. Embodiments may also include a navigation mode. Embodiments may also include a power-consumption mode. Embodiments may also include a VR display mode. Embodiments may also include a payload-deployment mode. Embodiments may also include a security mode. Embodiments may also include a communication mode. Embodiments may also include a defense mode. Embodiments may also include a failure mode.

In some embodiments, the flight mode may include at least one of a long-distance flight mode, a short-distance flight mode, a take-off flight mode, a landing flight mode, a stealth flight mode, a skid flight mode, a power-saving flight mode, a payload-delivery flight mode, a video flight mode, an autonomous flight mode, a manual flight mode, or a hybrid manual and autonomous flight mode.

In some embodiments, the system may include instructions for modifying a set of executable flight instructions. In some embodiments, the system may include an instruction for initializing the burdened-flight profile. In some embodiments, the instruction for initializing the burdened-flight profile may be at least partially based on the payload-identification data.

In some embodiments, the instructions for modifying the set of executable flight instructions may include instructions for modifying one or more of flight-mode instructions, navigation-mode instructions, security-mode instructions, payload-deployment-mode instructions, communication-mode instructions, or failure-mode instructions. In some embodiments, the multi-payload burdened-flight profile may include at least one of multi-payload compatibility, multi-payload communications, or multi-payload activation. In some embodiments, the burdened-flight profile may include a multi-payload burdened-flight profile.

Embodiments of the present disclosure may also include a method for improving, or even optimizing, flight of an unmanned aerial vehicle (UAV) including a payload, the method including receiving one or more human-initiated flight instructions. Embodiments may also include determining a UAV context based at least in part on Inertial Measurement Unit (IMU) data from the UAV.

Embodiments may also include receiving payload-identification data. Embodiments may also include accessing a laden-flight profile based at least in part on the payload-identification data. Embodiments may also include determining one or more laden-flight parameters. In some embodiments, the one or more laden-flight parameters may be based at least in part on the one or more human-initiated flight instructions, the UAV context, and the laden-flight profile.

In some embodiments, the method may include a load-authentication sequence. In some embodiments, the unmanned aerial vehicle (UAV) interrogates an attached smart payload with an authentication protocol based at least in part on the payload-identification data. In some embodiments, the unmanned aerial vehicle (UAV) confirms a mechanical connection between the unmanned aerial vehicle (UAV) and an attached payload, the confirmation including at least one of a visual confirmation of the mechanical connection. Embodiments may also include an electrical connection with the mechanical connection. Embodiments may also include a wireless connection between the unmanned aerial vehicle (UAV) and the attached payload. Embodiments may also include a make/break connection.

In some embodiments, the unmanned aerial vehicle (UAV) interrogates an attached smart payload with a wireless protocol, a QR code, an optical reader, or an electrical connection. In some embodiments, the method may include a load-verification sequence. In some embodiments, the unmanned aerial vehicle (UAV) interrogates an attached smart payload with a verification protocol based at least in part on the payload-identification data.

Embodiments may also include a payload send-communication protocol including receiving payload communication from an attached payload. Embodiments may also include transmitting the payload data via a communications channel with a Ground Control Station. In some embodiments, the method may include a mechanical-load-attachment-verification sequence. In some embodiments, the unmanned aerial vehicle (UAV) confirms a mechanical connection between the unmanned aerial vehicle (UAV) and an attached payload.

In some embodiments, the method may include receiving a payload communication from an attached payload. Embodiments may also include authenticating a payload-communication credential from the attached payload. Embodiments may also include wirelessly transmitting the payload communication. Embodiments may also include receiving a human-initiated flight instruction including one or more of a flight-elevation instruction, a movement instruction, an acceleration instruction, a hover instruction, a banking instruction, a calibration instruction, a payload-engagement command, and a payload-disengagement command.

Embodiments may also include receiving one or more human-initiated flight instructions including a payload-arming command, an authentication request, or a weight-calibration command. Embodiments may also include receiving one or more human-initiated flight instructions including an automated command sequence.

Embodiments may also include an automated command sequence including an object-recognition sequence, an obstacle-collision-avoidance calculation, a pedestrian-collision-avoidance calculation, or an environmental-collision-avoidance calculation. Embodiments may also include a drone context, which may be one or more of a drone-operating status, and a system capability.

Embodiments may also include a drone context including one or more of a payload-armed status, an authentication status, a group membership, a lead-drone status, a follower-drone status, a mission status, a mission objective, engagement in an automated command, a maintenance-alert status, a reduced operational capacity, a maximum range, and a battery-life status. Embodiments may also include a drone context including one or more of an indoor/outdoor flight transition, an environmental low-visibility status, a high-wind status, an air-pollutant status, a chemical-presence status, a munitions status, a high-electromagnetic-radiation alert, a humidity status, a temperature-alert status, or a detected audible alert.

Embodiments may also include determining a drone context based at least in part on Inertial Measurement Unit (IMU) data from the UAV. In some embodiments, the drone context may be a ground-truth reading. In some embodiments, the Inertial Measurement Unit (IMU) attribute may include an IMU dataset generated by applying a neural network to filter the IMU data.

Embodiments may also include an Inertial Measurement Unit (IMU) attribute including data containing a linear acceleration ($a_x$, $a_y$, $a_z$) and an angular velocity ($v_x$ $v_y$, $v_z$). In some embodiments, a state estimate of one or more of a position, a velocity, or an orientation in a body frame and an inertial frame of the unmanned vehicle may be determined from the linear acceleration and the angular velocity of the received IMU attribute.

Embodiments of the present disclosure may also include a system for improving, or even optimizing, flight of an unmanned aerial vehicle (UAV) including a payload, the system including a microprocessor-based controller operable to execute the following operational instructions for receiving one or more human-initiated flight instructions. Embodiments may also include instructions for determining a UAV context based at least in part on Inertial Measurement Unit (IMU) data from the UAV.

Embodiments may also include instructions for receiving payload-identification data. Embodiments may also include instructions for accessing or calculating a laden-flight profile based at least in part on the payload-identification data and. Embodiments may also include instructions for determining at least one set of burdened-flight parameters. In some embodiments, the burdened-flight parameters may be based at least in part on the human-initiated flight instruction, the UAV context, or the burdened-flight profile.

Embodiments may also include an instruction for receiving a human-initiated flight instruction including one or more of a flight-elevation instruction, a movement instruction, an acceleration instruction, a hover instruction, a banking instruction, a calibration instruction, a payload-engagement command, and a payload-disengagement command. Embodiments may also include instructions for receiving one or more human-initiated flight instructions including a payload-arming command, an authentication request, or a weight-calibration command.

Embodiments may also include instructions for receiving one or more human-initiated flight instructions including an automated command sequence. Embodiments may also include an automated command including one or more of a return-home command, a takeoff command, a calibration maneuver, a landing, a payload approach, a motor-on mode, a standby mode, a breach command, or a fly-to-waypoint command.

In some embodiments, the system may include a plurality of drones and a ground command station (GCS). In some embodiments, the GCS may include a transceiver in communication with the plurality of drones. Embodiments may also include a microprocessor-based controller operable to execute the following operational instructions including associating a plurality of drones as group members withing a group membership.

Embodiments may also include designating at least one drone from the plurality of drones as a lead drone within the group membership. Embodiments may also include designating at least one drone from the plurality of drones as a follower drone within the group membership. Embodiments may also include receiving a lead-drone flight command. Embodiments may also include determining at least one follower flight-path instruction for the at least one follower drone based at least in part on the lead-drone flight command. In some embodiments, the transceiver transmits the at least one follower flight-path instruction to at least one follower drone within the group membership.

Embodiments may also include an automated command sequence including an object-recognition sequence, an obstacle collision-avoidance calculation, a pedestrian collision-avoidance calculation, or an environmental collision-avoidance calculation. Embodiments may also include a drone context including one or more of a drone operating status or a system capability.

Embodiments may also include a drone context including one or more of a payload-armed status, an authentication status, a group membership, a lead-drone status, a follower-drone status, a mission status, a mission objective, engagement in an automated command, a maintenance-alert status, a reduced operational capacity, a maximum range, and a battery-life status. In some embodiments, the instructions for modifying the executable flight instructions include one or more of a flight mode, a navigation mode, a security mode, a payload-deployment mode, a communication mode, or a failure mode.

Embodiments may also include an instruction confirming that a flight performance matches the laden-flight profile including implementing one or more instructions from a calibration mode. Embodiments may also include receiving an Inertial Measurement Unit (IMU) attribute based at least in part on the implemented calibration instruction. Embodiments may also include identifying the laden-flight profile. Embodiments may also include confirming a match between the Inertial Measurement Unit (IMU) attribute and the identified laden-flight profile.

Embodiments may also include a drone context including one or more of an indoor/outdoor flight transition, an environmental low-visibility status, a high-wind status, an air-pollutant status, a chemical-presence status, a munitions status, a high-electromagnetic-radiation alert, a humidity status, a temperature-alert status, or a detected audible alert. Embodiments may also include an instruction for determining a drone context based at least in part on Inertial Measurement Unit (IMU) data from the UAV. In some embodiments, the drone context may be a ground-truth reading. In some embodiments, the Inertial Measurement Unit (IMU) attribute may include a step of using a neural network to filter an IMU dataset.

Embodiments may also include an Inertial Measurement Unit (IMU) attribute including data containing a linear acceleration ($a_x$, $a_y$, $a_z$) and an angular velocity ($\Omega_x$ $\Omega_y$, $\Omega_z$). In some embodiments, a state estimate of one or more of a position, a velocity, or an orientation in a body frame or in an inertial frame of the unmanned vehicle may be determined from the linear acceleration and the angular velocity of the received IMU attribute.

In some embodiments, an Inertial Measurement Unit (IMU) attribute may include information indicative of one or more of a yaw of the unmanned vehicle, a relative pose between two sequential moments, a 3D trajectory, a ground-truth linear velocity, a target-tracking command, or a predicted linear-velocity vector ($V_x$, $V_y$, $V_z$). In some embodiments, the Inertial Measurement Unit (IMU) attribute may be based on one or more Inertial Measurement Unit sensors.

In some embodiments, the Inertial Measurement Unit (IMU) attribute may be augmented by using LIDAR data to characterize the drone's position within an environment mapped with a LIDAR unit. Embodiments may also include a laden-flight profile including flight parameters, dynamic payload management, and a payload identification. Embodiments may also include a laden-flight profile including a rule set for informing the laden-flight profile based on a recommended maximum drone velocity. Embodiments may also include a recommended drone acceleration. Embodiments may also include a recommended drone deceleration.

Embodiments may also include a minimum drone turning radius. Embodiments may also include a minimum distance from an object in a flight path. Embodiments may also include a maximum flight altitude. Embodiments may also include a formula for calculating a maximum safe distance. Embodiments may also include a maximum laden-weight value.

Embodiments may also include a maximum angle or one or more axis of an in-flight drone command. Embodiments may also include a monitor-and-adjust-arming status. Embodiments may also include a hover travel based at least in part on an IMU or LIDAR sensor. Embodiments may also include a coordinate with ground control and other drones. Embodiments may also include monitor-and-adjust power-consumption modes. Embodiments may also include one or more guidelines to modify pilot input parameters.

In some embodiments, the system may include operational instructions for transmitting a video feed to a Visual Guidance Computer (VGC). Embodiments may also include initializing a queuing system and a visual tracker. In some embodiments, the microprocessor-based controller may be further operable to execute the following operational instructions: transmitting a video feed to the Visual Guidance Computer (VGC) and the visual tracker. Embodiments may also include receiving a configuration package associated with a payload.

Embodiments may also include an instruction for initializing a laden-flight profile based at least in part on the identification data of one or more payloads. Embodiments may also include an instruction for initializing a laden-flight profile based at least in part on the identification data of one or more payloads, the laden-flight profile further including instructions for modifying the executable flight instructions.

In some embodiments, the laden-flight profile includes a multi-payload compatibility instruction, communications protocol, and activation procedure for one or more of a payload connection without microcontroller communication. Embodiments may also include a payload connection including a microcontroller communication. Embodiments may also include a drone as router or network switch. In some embodiments, the drone as a router transmits payload communications to a ground control station.

Embodiments may also include an instruction for initializing a laden-flight profile based at least in part on the identification data of one or more payloads may include implementing an instruction confirming a flight performance matches the laden-flight profile. Embodiments may also include an instruction for determining a drone context based at least in part on an Inertial Measurement Unit (IMU) attribute including implementing one or more instructions from a calibration mode. Embodiments may also include gathering temporal sensor data indicative of a response to the one or more instructions from a calibration mode. Embodiments may also include storing the temporal sensor data. Embodiments may also include adjusting the laden-flight profile.

DETAILED DESCRIPTION

Figure 1A:
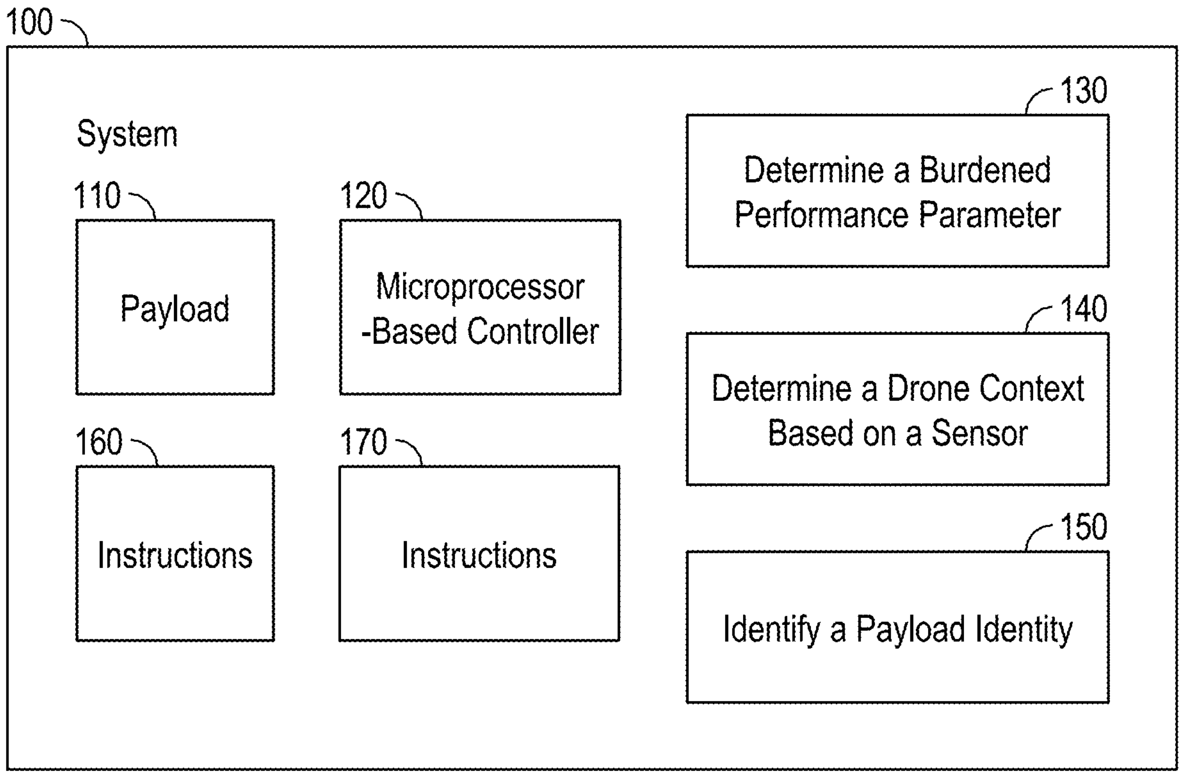
FIG. 1A is a block diagram illustrating a system, according to some embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In the broadest sense, payload management is how an unmanned aerial vehicle (UAV) or drone (UAV and drone hereinafter being used interchangeably) and its systems interact with an attached (or even detached, e.g., dropped or delivered after flight) payload. A payload can be something permanently or temporarily attached to a UAV that may or may not be permanently modified to carry a payload. Examples of payloads include, but are not limited to, a single camera, multiple cameras housed in a camera array, LiDARs, infrared imagers, LED lights, laser lights, an antenna, a net or other anti-drone device, a package for delivery, an amalgamation of specialized sensors to help a UAV navigate beyond its normal sensor capabilities, a first-aid kit packaged for a UAV to carry, ordnance that is to be dropped on an enemy location, a containerized-liquid payload, a containerized-gaseous payload, or a battery to extend a UAV's flight range. Payloads can be modified for purpose. For example, a UAV intended for use on an inspection mission may be adapted with a non-destructive-testing (NDT) system for visual or penetrating inspections, such as ground-penetrating radar or an X-ray backscatter system.

As used herein, a UAV microprocessor-based controller may refer to various types of microcontrollers, such as an 8-bit microcontroller, a 16-bit microcontroller, a 32-bit microcontroller, an embedded microcontroller, or an external-memory microcontroller. Such microprocessor-based controllers often include memory, processor, and programmable I/O. Examples include single-board computers (SBC) such as Raspberry Pi, system-on-a-chip (SOC) architectures such as Qualcomm's Robotics RB5 Platform (providing AI engine, image signal processing, enhanced video analytics, and 5G compatibility), and System on Modules (SOM) such as NVIDIA's Jetson AI computing platform for autonomous machines (providing GPU, CPU, memory, power management, high-speed interfaces, and more). Microprocessor-based controllers may also include complex-instruction-set microprocessors, Application Specific Integrated Circuits (ASICs), Reduced Instruction Set Microprocessors, and Digital Signal Multiprocessors (DSPs).

As a drone transitions from an out-of-the box configuration, sometimes referred to as an unladen or unburdened operating profile or operating envelope having known maximum/minimum flight speeds, maneuvering capabilities, and other performance characteristics, to a laden or burdened operating profile with, for example, a new weight distribution, maximum/minimum operating speeds, the overall operating envelope of the drone may change. In accordance with an example scenario in which a single UAV is capable of connecting to both smart (e.g., those payloads with data-processing capabilities) and dumb payloads (e.g., those payloads without data-processing capabilities), the developers of the instant embodiments have developed an extensible platform for connecting to any payload or payload type while still delivering an easy-to-use pilot experience in varied conditions to achieve improved, or even optimum, flight performance and payload-deployment performance.

Payload characteristics may change during flight, for example if the UAV stops at various locations to pick up and add to its payload, or to drop off and reduce its payload. These changes may not be easily predicted beforehand and may impact flight operations significantly.

Exemplary Scenarios

Many different scenarios exist in which an operator may wish to carry, use, and deploy a payload. For example, without limitation, some common payload scenarios may include Pickup/Drop Off, Pickup/Drop Off/Return, Roundtrip, Perimeter, and/or other scenarios. A Pickup/Drop Off scenario may include picking up a payload at Point A, and dropping it off at Point B. Common payloads in this scenario are consumer packages for delivery to a customer or first aid packages for delivery to a person in need. A Pickup/Drop Off/Return scenario may include picking up a payload at Point A and dropping it off at Point B. Then, picking up another payload either at Point B or some other location, and returning it to Point A.

For example, a UAV might drop off supplies at Point B, and then pick up intelligence information in a small disk drive or camera at Point B to be returned to the home base at Point A. A Roundtrip scenario may include scenarios where a payload is picked up at Point A, goes to Point B or along some determined flight path, and then back to Point A.

A surveillance scenario may involve a drone picking up a camera array as the payload, flying out to take pictures of a location of interest, transmitting the pictures to a ground station, or returning with the pictures to its original location. In some embodiments, an operating system for managing a plurality of piloted unmanned vehicles may orchestrate the movement of the unmanned vehicles in a coordinated fashion through a flight profile. For example, when multiple UAVs are used to navigate the perimeter of a building, a flight profile may govern key behavioral parameters when a remote pilot actively navigates one drone. In such a scenario, an operating system may transmit instructions to other UAVs not actively piloted to hover in place, create an alert when motion is detected, join the piloted drone, illuminate the field of view, maintain a minimum distance while patrolling the perimeter, and the like. In such an example, the operating system may trigger operational instructions on each drone automatically or may use an input, such as a sensor input, operational or flight context.

In a still further example of a surveillance scenario, for a piloted UAV with an attached payload, the operating system may augment the pilot's performance in accomplishing routine security tasks. For example, a drone is to take an offensive or defensive position around a marked area. Here, the drone would take off from Point A and circle or navigate around a fixed or dynamically bounded area for a predetermined amount of time or until a certain condition is met, such as coming into contact with an expected enemy UAV or intruder. In this scenario, a drone might carry a payload designed to protect or defend or surveil friendly ground units, or instead may be equipped with a payload that could be armed and detonated against an enemy UAV or ground target that was too close to the drone or whatever the drone was instructed to protect. In yet another scenario, a drone with a payload may be configured to detonate itself upon a window, door, or other target if such a target is identified and encountered during its perimeter flight.

In a further embodiment, a drone may fly with a payload to a destination point, drop the payload for the payload to carry out a sequence of activities, and the drone may then maintain communications with the payload after it has dropped the payload, e.g., to receive data from the payload about the post-drop activity of the payload. This post-deployment communication may be between or among any of the drone, the payload adaptor, the payload, or a ground control station.

Drone Payload Management

For example, without limitation, a drone may be configured with one or more of various aspects of a payload-management operating system. These various aspects include, but are not limited to, payload identification, payload connectivity, payload attachment, payload-state monitoring and control, enabling payload missions, adjustment to flight mode based on payload dimensions or changes in dimensions, payload deployment, or other aspects of payload management. The more sophisticated the payload-identification process is, the more likely machine learning or other classification technology is used.

In some embodiments, a payload-management profile is provided. The payload-management profile may include a laden-flight profile of flight parameters. In some embodiments, a laden-flight profile may also include an instruction confirming a flight performance matches the laden-flight profile. The laden-flight profile may include implementing one or more instructions during a calibration mode where a drone initiates a flight operational instruction with an attached payload. Embodiments may also include receiving an Inertial Measurement Unit (IMU) attribute-based at least in part on the implemented calibration instruction. Embodiments may also include identifying the laden-flight profile. Embodiments may also include confirming a match between the Inertial Measurement Unit (IMU) attribute and the identified laden-flight profile.

Embodiments may also include an instruction confirming a flight performance matches the laden-flight profile and further may include implementing one or more instructions from a calibration mode. Embodiments may also include receiving an Inertial Measurement Unit (IMU) attribute-based at least in part on the implemented calibration instruction. Embodiments may also include identifying the laden flight profile. Embodiments may also include confirming a match between the Inertial Measurement Unit (IMU) attribute and the identified laden-flight profile. Embodiments may also include initiating IMU sensors to confirm a flight parameter including the weight of the drone and payload, a center of gravity of the drone and payload to confirm an expected flight parameter, for example, a maximum flight speed, acceleration, turning radius, maximum/minimum flight altitude, and the like.

In some embodiments, a laden-flight profile may include a rule set for informing the laden-flight profile based on one or more of the recommended maximum drone velocities. Embodiments may also include a recommended drone acceleration. Embodiments may also include a recommended drone deceleration. Embodiments may also include a minimum drone turning radius. Embodiments may also include a minimum distance from an object in a flight path.

Payload Identification

Payload identification may include a drone configured to automatically recognize a payload or payload type, and to take steps to adjust its own controls and behavior to better serve the mission requiring the payload. Such adjustment may include augmenting a drone's own parameters, such as flight parameters, particularly if the payload has its own sensors and control/navigation capabilities. In some embodiments, once connected to a drone, a payload may override the navigation or other controls of the drone to control flight, delivery of the payload, coordination with other drones, communication with a pilot, or another mission parameter.

In some embodiments, if a drone has classified a payload as explosive, then the drone may be able to initiate a quick-release option in case its own onboard sensors indicate that the payload is vibrating heavily. In some embodiments, if a drone has classified a payload as including a temperature-sensitive biological agent, for example, a cargo of vaccines, a sensor may be activated on-board the drone, for example a thermal sensor such as a thermal camera to monitor the temperature of the package.

Alternatively, the cargo may include sensors to monitor the state of the payload. In such an instance in which the payload has been identified, the drone may initiate a protocol to activate communication ports on the payload to transmit temperature data to the drone, and subsequently to cause the drone to relay the temperature requirements to a Ground Control System (GCS) where the temperature data may be monitored by a drone pilot. Similarly, a drone may be able to recognize that a payload has an external Global Positioning System (GPS) antenna and can thus work to synchronize that antenna to provide the drone with redundant GPS capability, or increase GPS accuracy, or an opportunity to turn off the drone's GPS antennae to preserve the drone's own onboard battery.

Depending on the level of identification possible, a drone might also recognize that once a given payload is dropped, its weight decreases by 10%, thus allowing a longer, safer return path than the one used to deliver the payload. As it makes those critical decisions, the drone could send its preliminary conclusions to a human operator for confirmation, or at least send the human operator a cue that it has made a decision that will stand unless overridden by the operator.

A drone may be configured to identify the type of payload based on wireless signals from the payload (e.g., radio, microwave, Wi-Fi®, cellular, Bluetooth®, RFID, infrared, or laser signals) or from a third party, such as a satellite or ground station in communication with the payload. The drone may be configured to use its own computer-vision capabilities via its camera system to identify a payload based on learned archetypes, such as being able to identify that a certain structure is a payload if it has a certain set of dimensions, or that a specific payload or payload type contains, e.g., first aid, food, or explosives. In some embodiments, the UAV or adaptor may identify a "dumb" payload as one that does not have sophisticated sensors and other connectivity options found in a "smart" payload.

In some embodiments, there may be multiple payloads attached to a drone, and thus multi-payload identification and recognition is important. For example, a total payload could consist of a heavy first-aid kit and an extra battery to extend the range of a drone intended to deliver the first-aid kit to a destination.

UAV Payload Management

For example, without limitation, there may be several various aspects of payload management. These various aspects include, but are not limited to, the following:

Payload Connectivity

Payload connectivity is generally how a drone, a pilot, or a 3rd party communicates with a payload. Connectivity can be wired or wireless communications, or perhaps none at all in the case of a "dumb" purely mechanical payload. Wireless connectivity may include Wi-Fi®, Cellular, Bluetooth, satellite, or some mesh networking or ad-hoc network variation. Wired communication may employ serial or other modern-connectivity options such as USB. Signaling may be encrypted and vary from simple messaging (TCP/IP), etc., to complex interfaces and protocols (e.g., MQTT/DDS) or drone-specific protocols MA VLink, UranusLink, and UAVCan.

Signaling can be one- or two-way, meaning that a payload may be given commands (or operational instructions) by the drone, its operator, a ground station, or a 3rd party, but may also communicate back to the drone, its operator, a ground station, or 3rd parties. A human operator to help determine the paths of communication and the degree of communication needed may be employed but the instant systems and methods are not limited thereto.

It may also be possible, and important, to recognize if payload is "dumb" in that it does not have sophisticated sensors and other connectivity options found in a "smart" payload.

Payload Identification

Verification is important in payload identification in that a compromised payload could in turn compromise a drone and the overall mission. Thus, visual and electronic confirmation that a payload is indeed approved and safe may be important. Much of this verification may occur via the physical and electronic connectivity between drone and payload. Verification mechanisms include user or pilot confirmation, encrypted communications or provision of a private key for verification, exchange of trusted keys, etc.

In accordance with various embodiments, a human operator may use an interface to confirm the initial identification of the payload by the drone or override a drone's identification based on visual inspection or other environmental clues. For example, a drone may not recognize a particular payload, but if the human operator knows that the drone is to pick up whatever is in a certain room, and the only item in the room looks like it could be picked up by a drone, then the drone could be directed to pick up such an object.

Payload identification in its most sophisticated form is a drone having functionality to automatically recognize a payload and to take steps to augment its own controls and behavior to better serve the mission involving the payload. Such augmentation could also include augmenting a drone's own parameters as well, particularly if the payload has its own sensors and control/navigation capabilities. It is possible that once connected to a drone, a payload could be permitted to override the navigation or other controls of the drone.

In some payload-identification embodiments, machine learning or other classification technology may be used for more accurate measurement or identification of a payload. For example, if a drone has classified a payload as explosive, then the drone may be able to initiate a quick release option in case the drone's own onboard sensors indicate that the payload is vibrating heavily, increasing in temperature, or indicating that it may soon explode. Machine learning may be used to stack rank-weighted scenarios based on experience or simulated mission events and outcomes.

In some payload-identification embodiments, a drone also may be configured to identify the type of payload based on wireless signals from the payload (e.g., Wi-Fi®, cellular, Bluetooth®, active RFID tag) or a third party, such as a satellite or ground station connected to the payload. The drone may be configured to use its own computer-vision capabilities via its camera system to identify a payload based on learned archetypes, such as being able to identify a certain structure is a payload containing first aid or food or an explosive ordnance. Similarly, a drone may be able to recognize that a payload has an external Global Positioning System (GPS) antenna and thus can work to synchronize that antenna to provide the drone with redundant GPS capability, or perhaps increased GPS accuracy. Depending on the level of identification possible, a drone might also recognize that once a given payload is dropped, its weight decreases by, for example, 10%, thus allowing a longer, safer return path than the one used to deliver the payload. As it makes those critical decisions, the drone could send its preliminary conclusions to a human operator for confirmation, or at least send the human operator a cue that it has made a decision that will stand unless overridden by the operator. In some embodiments, if a drone has classified a payload as explosive, then the drone may be able to initiate a quick-release option in case its own onboard sensors indicate that the payload is vibrating heavily, increasing in temperature, or indicating that it may soon explode. Machine learning may be used to stack rank weighted scenarios based on experience or simulated mission events and outcomes.

Figure 2A:
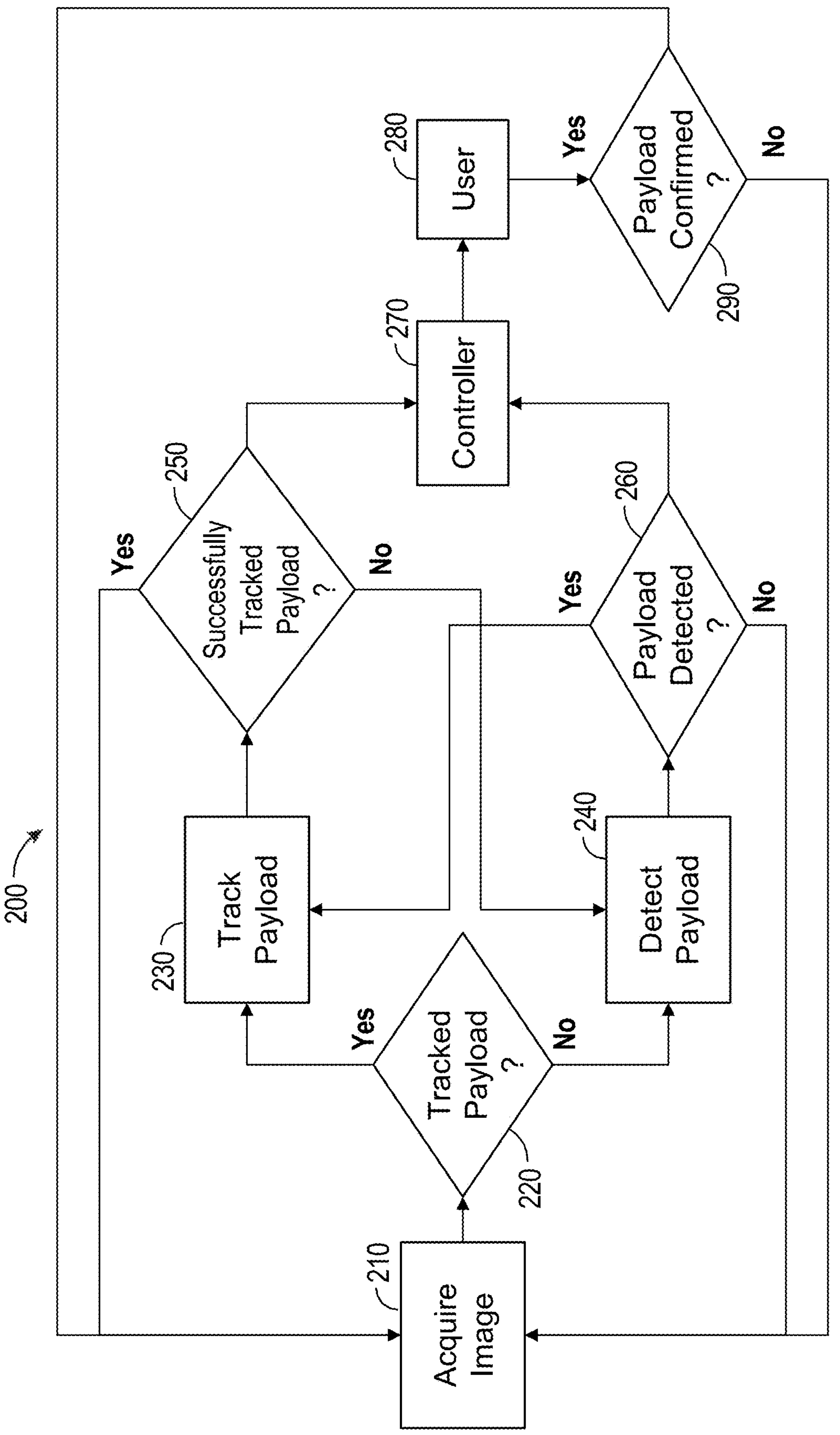
FIG. 2A illustrates a multimode system for identifying and tracking a payload, according to some embodiments of the present disclosure.

Referring now to FIG. 2A, an exemplary flow of a multimode payload tracker is provided. In one embodiment, at 210 the camera system acquires an input RGB image at a suitable sampling rate (for example of 30 FPS). In a target-tracking mode at 230, for example, when a payload object is already being tracked, a tracker mode will attempt to locate the payload within the field of view within the new image. If the tracker mode fails, the detector mode will attempt to identify a payload within the field of view of the received image. Alternatively, if there is no payload currently being tracked, at 240 a detector mode will attempt to detect a new payload. At any point a detected and tracked payload can be discarded by the user, in which case the Detector will attempt to detect a new target. The tracked target bounding box is transmitted to the Controller (via UART connection), which visualizes the target in the FPV video feed.

In an alternative embodiment, a stereo camera may be used to detect a payload within a reference frame of a video feed. The accumulated optical flow from the Key Frame to the current one is computed. The tracked features are undistorted using the Tracking Camera intrinsic calibration. Using ground features (optionally the whole image), the homography between the key-frame undistorted features and the current-frame corresponding undistorted features is computed, using RANSAC or similar algorithm for outlier detection. The outliers are used as candidates for the detected object, and are filtered based on clustering both in the velocity and image space.

Payload Attachment

Payload attachment is the technology used to physically and electronically connect the drone to a given payload. This attachment may be done via a payload adaptor such as an electro-mechanical harness that serves as an intermediary layer between the drone and the payload. The harness may be an optional layer. In accordance with various embodiments, the harness may be a fixed attachment to the drone, or it may be a removeable attachment to the drone. The harness may also be configured to attach to the payload, and then be able to release the payload, but stay attached to the drone after the payload is released. A "smart harness" that integrates sensor data from the drone and the payload to help with navigation and mission-centric decisions is also described herein.

Effective payload attachment may be closely tied to connectivity, for example the method by which connectivity happens. Important data regarding decisions around the attachment and release of the payload may be transferred to the payload through the payload-attachment harness and via the payload-connectivity options discussed above.

Payload State

Payload State is the technology that determines the current state of a payload, the drone relative to the payload, or the combined entity of the drone and connected payload. This technology may be highly dependent on payload connectivity, influenced by payload attachment technology, and closely concerned with understanding a drone/payload duo's status relative to an overall mission. This logic may be provided by a microcontroller either on the drone, the payload, or both on the drone and payload.

Understanding the state of a payload may be important because payload size, weight, power demands, and other factors can have a large impact on the flight envelope and the flight performance of a UAV. In addition, many payloads are potentially dangerous to their human operators or the drone itself, and therefore are typically armed/de-armed in a specific safety sequence. For example, the instant-payload-transition technology described herein can help determine if a payload has an approved weight, allowing the drone to take off, at what level the drone should initiate alarms if for some reason a rotor fails while an explosive payload is attached, or whether a drone can safely drop an explosive payload if its barometer or other sensor fails.

For example, as the weight of a drone with its payload changes, its flight envelope and attendant power-consumption and flight-navigation modes may also change. Depending on the payload, additional levels of verification and sensor monitoring may be required, especially if the payload requires arming and a specific safety sequence. Based on the state of a payload, entire flight modes may be activated, such as an infrared view for the human operator, or enhanced security modes that limit receiving of wireless transmissions once a payload is armed.

One of the most important parameters of the drone/payload pairing is actual flight. Thus, in addition to understanding the state of the payload itself, it is also important to understand at all times the state of the drone/payload pairing. Information about specific drone/payload unification may be produced by effective sensor fusion between a drone, its payload, and any remote or $3^{rd}$ party elements such as ground stations and satellites that can assist the drone before, during, or after carrying its payload.

Once the states of the payload and drone are known, advanced commands such as asking a drone to visually verify an explosion after dropping an explosive payload can be more easily translated into digestible commands for the drone. For example, having detailed data on payload arming, drop, and subsequent explosion could allow a human operator to direct the drone to execute a circular flying pattern for some period and at some altitude based on the characteristics of the payload. These advanced commands may involve sensor fusion of the drone's indoor and outdoor sensors, along with any additional data streams available to it from a ground station.

A payload manager as described herein may enhance the physical and electronic features of a drone platform, thus increasing the number of mission profiles that can be performed with a given drone system. For example, regarding a drone with only natural light, limited-zoom onboard cameras may cause the drone's surveillance capabilities to have certain limitations. By enabling a payload manager to interface with a camera payload for better surveillance imaging, a drone could enhance significantly the camera technology available to it, such as including 1080p video, infrared, high-speed, and sophisticated digital and optical zooming. A payload also could provide added battery life to a drone to extend its range, or even provide a mechanism for additional pilots or 3rd parties to take temporary or permanent control of the drone away from a primary operator.

The arming sequence, sometimes referred to as a payload-activation sequence, is, broadly speaking, the technology that enables a change in activation state (typically activation or deactivation) of certain drone functionality, or more commonly, certain functionality of a payload attached to a drone. This activation/deactivation state change can occur based on a variety of conditions such as time, location, sensor status, mission condition, and/or other conditions. This activation/deactivation state change can occur based on a variety of conditions, non-limiting examples of which may include the following:

Time. For a time condition, activation/deactivation may be based on reaching a time value found on an internal electrical clock, an atomic clock signal from a ground location or from navigation satellites, a human-controlled clock, or even a rough estimation of time based on the position of celestial objects.

Location. For a location condition, activation/deactivation could occur based on a drone reaching certain physical latitude/longitude coordinates, altitude, position relative to an obstacle or target, or based on a location approximation as estimated by a human operator.

Sensor Status. For a sensor-status condition, activation could occur based on the data from one or more sensors. For example, a payload could be activated once a drone's GPS antenna achieved an adequate signal, and once the drone confirmed an outdoor altitude with data from the drone's onboard barometer.

Mission Condition. For a mission condition, activation could occur when a drone completed some milestone of a mission, which may be one or more conditions as described above, such as flying a certain distance, or for a certain amount of time, or when a human operator sees that a drone has reached a certain physical or logical mission objective, such as a waypoint, or obstacle. It could further be based on specific sensor readings, such as identifying an antagonistic human or machine along a given flight path.

Payload activation may be done electromechanically, for example through the triggering of a drone's or payload's logic by signals from software or middleware. Based on these signals, a UAV may be configured to direct additional software algorithms to perform certain actions, for example, actuating physical locks, clasps, and other connectors to change state (e.g., open/close/rotate/apply more or less pressure), or to initiate a combination of software and hardware actions to occur.

Figure 14:
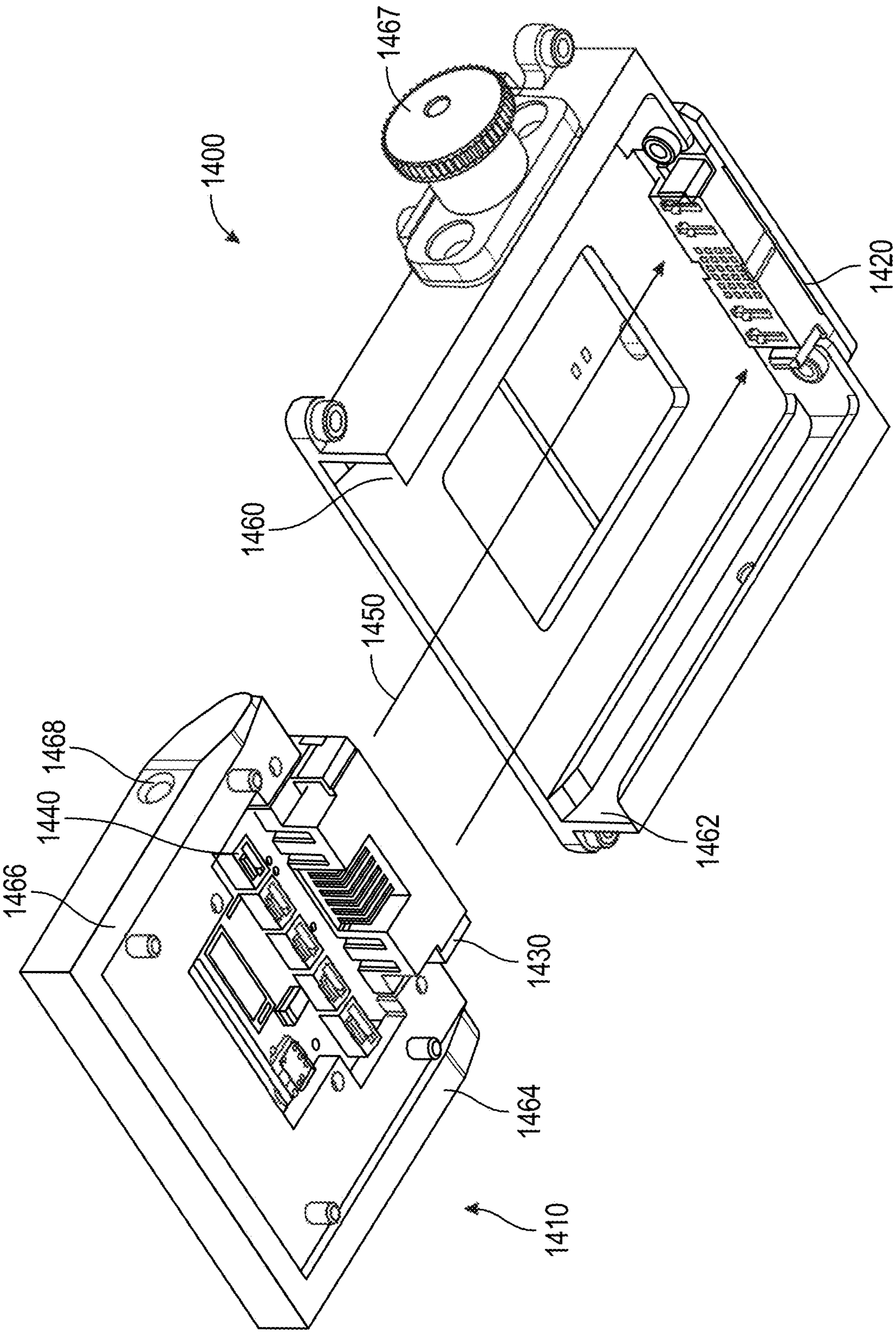
FIG. 14 illustrates a payload electromechanical harness configured to couple a payload to an unmanned piloted vehicle, in accordance with one or more embodiments of the present disclosure.

It is contemplated that this electromechanical activation/deactivation may occur via an adaptor such as, for example, an electromechanical harness that is physically connectable to both a drone and an associated payload. An example is illustrated in FIG. 14.

The arming signaling may be received by the drone's microprocessor via an arming algorithm or similar subroutine as part of the drone's payload or navigation functionality. Activation and deactivation of the payload may in turn effectuate one of a number of different states of the payload, for example, on/off, deploy mode, self-destruct, or transfer of control to a 3rd party for communication or control of the payload.

In accordance with various embodiments, a drone may have, as part of the arming sequence, some "understanding" of the payload's contents, the intended flight path of the payload's mission, and/or the potential risks associated with a payload. For example, if the payload is highly valuable and absolutely must not fall in the hands of an adverse party, then the arming sequence may have a self-destruct sequence that could be activated in addition to enabling the key functions or components of the payload, such as a camera array. Thus, there is the concept of multi-layered or multi-step activation in that different levels of activation could occur; an activation or deactivation sequence may not necessarily lead to a binary outcome.

Of potential interest is the drone being aware of its 3D position not just relative to specific ground-based landmarks, but also in geopolitical space, and for certain parameters to determine what portion of a payload is to be armed. For example, if a drone were instructed to maximize survivability in a surveillance mode while flying close to a contested border where there was not clear permissive airspace, the drone payload may be 'armed' or activated to take photos of the ground within that contested airspace while moving slowly. Then, only instructing the payload to upload those photos via a satellite link once it was a set distance from the contested border, and then, once sufficiently clear of the border, de-arming the payload and initiating a high-speed flight mode. In another scenario, if surveillance via drone operation was illegal in a certain jurisdiction, an intelligence agency may enable automatic deactivation of a drone's camera array while in that jurisdiction's airspace as calculated by its onboard sensors, ground beacon signals, or GPS data, but enable automatic reactivation of that same array once the drone had passed into unrestricted airspace.

Enabling Payload Missions

An arming sequence may enable a drone system to "activate" and "deactivate" a payload, or even itself. This is particularly useful when the payload that is activated has limited resources or consumables (e.g., limited memory for recording audio or video) or is scheduled to be dropped. When the payload is explosive, for example, the arming sequence protects the drone and those around it from the potential dangers of the explosive; for example, the arming sequence may involve not enabling the explosive until the drone is airborne and some distance from its human operator or a populated civilian area. Activation also can be as simple as switching the state of one or more components of a drone, so the payload's possible activation could be used in conjunction with a subscription-based business model where, for example, there were onboard infrared cameras aboard a drone, but the human operator would be charged for a different mission or monthly price based on which features of the drone were activated.

Further, a menu of activation of various payloads or payload functions may be available to a drone pilot, e.g., by switching the state of one or more components of a drone.

Accordingly, payload activation could be used in conjunction with a subscription-based business model in which a drone operator may be charged according to which payloads of payload functions are used during a given mission. Alternatively, a drone operator may be charged according to length of mission, risks involved, or by usage duration, e.g., by the hour, day, week, or month.

Embodiments described herein provide a payload manager that is operable to interrogate a UAV-attached payload for identification data, which when received from the payload may provide to the drone identification data indicative of one or more characteristics of the payload over a communications link. The payload manager may utilize the identification data indicative of a characteristic of the payload along with active determination of flight dynamics to change, dynamically, the payload characteristics and to change, dynamically, the flight parameters as a flight progresses.

Throughout the disclosure, the vehicles are referred to as a UAV and UAVs. As used herein, the term UAV refers to unmanned aerial vehicle(s), which also may be known as drone(s) and similarly identified robotic or human-controlled remote aerial vehicle(s). The present disclosure may be applicable to all types of unmanned aerial vehicles and reference to a UAV is intended to be generally applicable to all types of unmanned vehicles.

FIG. 1A depicts a system 100, according to some embodiments of the present disclosure. A system 100 may be, without limitation, a drone, where a drone may be any remotely controlled unmanned vehicle, non-limiting examples of which include a submarine-capable unmanned vehicle, a marine-capable unmanned vehicle, a terrestrial unmanned vehicle, and an unmanned aerial vehicle (UAV). In one embodiment, the system 100 may include a payload 110 and a microprocessor-based controller 120. The microprocessor-based controller 120 includes a non-transitory computer-readable storage medium having instructions stored thereon that when executed by the controller causes the controller to perform various tasks for managing a payload 110. The tasks may be carried out by several instructions that determine a burdened-performance parameter 130, determine a drone context based on a sensor 140, identify a payload identity 150, determine a performance profile based on the payload ID, and determine a set of burdened-performance parameters 170 for managing a payload 110.

In some embodiments, determining a burdened-performance parameter 130 captures how a system 100 translates a human-initiated operating instruction, the context of the system, and a burdened-operating profile as it relates to the presence of a payload 110. A human-initiated operating instruction is dependent on the system type. For a UAV, for example, a human-initiated operating instruction, or human-initiated flight instruction, might be a command to take-off, lower in elevation, fly in a direction, hover, engage a payload 110, drop a payload 110, accelerate in a direction, and other human-initiated instructions. For a marine unmanned vehicle, for example, a human-initiated operating instruction might include a descent command, an ascend command, a directional command, a scan of the environment such as a sonar scan, a hover command, a command to modify a ballast, and other commands a marine unmanned vehicle might perform. While examples of a human-initiated operating instruction have been described as they relate to a UAV and a marine unmanned vehicle, human-initiated instructions are those that are transmitted and carried out in the operation of a system 100.

In some embodiments, a system may perform a task, such as determining a drone context based on a sensor 140. A context may refer to an operating status such as on, off, active, idling, hovering, or an operating mode such as a night-time mode and the like. In a further embodiment, a context may refer to a status of the system 100. In some embodiments, a status may be related to an environmental condition, for example an indoor/outdoor flight transition, an environmental low-visibility status, a high-wind status, an air-pollutant status, a chemical-presence status, a munitions status, a high-electromagnetic-radiation alert, a humidity status, a temperature-alert status, and a detected audible alert.

Determining a drone context may be enhanced by confirming the context using a sensor at 140, which confirming may involve using an inertial measurement unit (IMU) in a UAV, or other sensor systems found on unmanned vehicles. Such sensors may be used to confirm or identify a context of a drone, for example, a ground-truth reading, linear-acceleration data, angular-velocity data, or an orientation in three-dimensional space. A context may include a state estimate of one or more of a position, a velocity, an orientation in a body frame, and an inertial frame of the UAV. Such information may be determined based at least in part on the linear-acceleration data and the angular-velocity data gathered by a sensor and stored as data, such as IMU data. In addition, IMU data may include one or more of a yaw of the drone, a relative pose between two sequential moments, a 3D trajectory, a ground-truth linear velocity, a target-tracking command, and a predicted linear-velocity vector ($V_x$, $V_y$, $V_z$). IMUs vary in sophistication in terms of the sensory equipment that may be available. In some embodiments, the IMU data may be augmented with LIDAR data, visual odometry data, and computer vision data to provide a remote pilot with greater contextual awareness of the drone's environment.

In some embodiments, identifying a payload identity 150 may be performed. Identifying a payload may occur over an electrical connection between the system 100 and the payload. For example, the electrical connection may be configured to allow transmission of payload identification data between the payload and the drone via copper traces and/or a wire harness between the payload 110 and another component of the system 100. An exemplary electrical connection may be accomplished by adapting a drone with a payload electromechanical harness 180, such as the payload electromechanical harness 180 depicted in FIG. 14.

Exemplary methods for initializing a system 100, for example, a UAV, for transitioning from an unladen to a laden state may include, but are not limited to, the following processes:

i. determining at least one set of burdened-flight parameters, wherein the burdened-flight parameters are based at least in part on the human-initiated flight instructions, the UAV context, and the burdened-flight profile.
ii. determining a UAV context based at least in part on Inertial Measurement Unit (IMU) data from the UAV;
iii. receiving payload-identification data;
iv. determining a burdened-flight profile based at least in part on the payload-identification data; and
v. determining at least one set of burdened-flight parameters, wherein the burdened-flight parameters are based at least in part on the human-initiated flight instructions, the UAV context, and the burdened-flight profile.

Figure 1B:
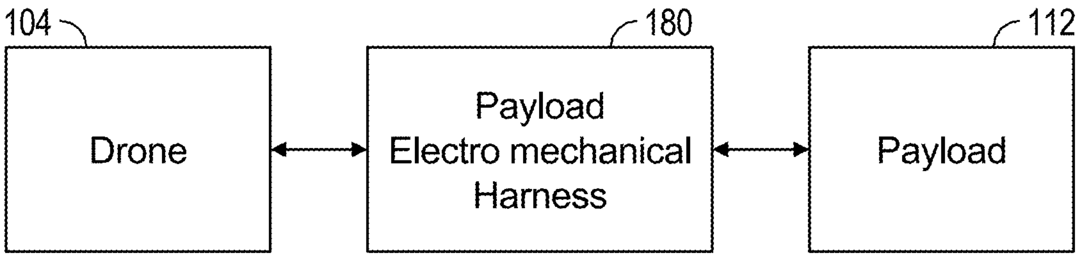
FIG. 1B is a block diagram illustrating the relationship between a drone, a harness, and a payload, according to some embodiments of the present disclosure.

Referring now to FIG. 1B, described is an exemplary transmission and reception between a done 104, a payload electromechanical harness 180 configured to couple a payload 112 to a drone 104, in accordance with one or more embodiments. Electromechanical payload harness 180 may be configured to provide a mechanical connection between the payload 112 and the drone 104. Electromechanical payload harness 180 may be configured to provide an electrical connection between the payload 112 and the drone 104 for passing information therebetween.

In some embodiments, a drone may traverse a distance and aid a pilot in recognizing a payload. Referring now to FIG. 2A, an exemplary system-flow diagram 200 is presented in which a candidate payload may be identified amongst a number of candidate objects from acquired images 210. In some examples, an acquired image 210 may be an RGB image acquired by an onboard camera at a suitable framerate given an environmental context and bandwidth limitations. In some embodiments, a suitable frame rate may be 30 FPS in a daytime context. When a greater resolution is desired, for example when a high-confidence level is desired for identifying the payload, a higher-resolution image and frame rate might be preferred. In a payload-tracking mode 220, if there is already an object being tracked by a tracker 230, the payload tracker 230 attempts to locate the payload 250 in a newly acquired image 210. The tracker 230 may use a previously acquired image as a reference image to identify a region within the newly acquired image 210 to look for the payload.

A variety of techniques may be used by the tracker 230, for example, image processing using computer vision. The tracker 230 may use any number of tracking methods. Three non-limiting tracking methods the tracker 230 uses include MOSSE, Median Flow, and Kernelized Correlation Filters. These techniques provide a spectrum of tracking accuracy with differing computational overhead. In some embodiments, potential payload candidates within the newly acquired image 210 may be annotated with a tracked-target bounding box. Such potential payload candidates and the tracked-target bounding boxes may be transmitted to a controller, for example via UART connection, which presents the potential payload candidates to a remote pilot in a First Person View (FPV) video feed.

Alternatively, if the attempt to locate the payload 250 fails, or if there is no currently tracked payload, a detector 240 attempts to detect a new payload amongst the candidate objects within the acquired image 210. A feedback loop 260 determines whether a candidate payload detected within the acquired image 210 matches a confirmed payload from a reference image. In some embodiments, a detected payload 260 or tracked payload 250 may be aggregated at a controller 270 for transmission to a user 280 to confirm the tracked payload 250 or detected payload 260 is within the acquired image 210. A user 280 may then decide to reject the candidate payload 290 within the acquired image 210 and request a new acquired image be captured. Alternatively, the user 280 may confirm the candidate payload 290, request a new acquired image 210, and register the payload for tracking in subsequent received images.

In some payload identification embodiments, machine learning or other classification technology may be used for more accurate measurement or identification of a payload. When an unmanned vehicle approaches a payload, onboard equipment may be used to scan the environment and detect objects or a payload of interest. For example, an unmanned vehicle may be equipped with a camera system (such as a CMOS-based camera system) or environment scanning technology, such as a LiDAR (light detection and ranging), a metamaterial array scanner, or SONAR (sound navigation and ranging) in maritime applications where infrasonic or ultrasonic systems may be used to scan for objects or a payload of interest. These systems may be complemented with First Person View (FPV) camera to relay a video feed to a remote pilot.

A machine learning-assisted payload identification system may include four main components: a target detector, a target tracker, a horizon detector, and a dual camera for visually scanning the environment. The dual camera may capture a video feed of the environment, where each frame or a series of frames selected based on a sample rate is used for target-location translation from the Tracking Camera and streamed to an FPV Camera image coordinate system.

In some embodiments, a target detector scans frames to determine the appearance of the payload within the image. For example, machine learning may be used to identify new candidate objects within the frame as a payload following training with representative payload images in a computer-vision system. In an alternative embodiment, machine learning may be used to highlight new potential candidate objects of interest. The new potential candidate objects of interest may be fed to the pilot along with visual cues a pilot may use to confirm the presence of the payload. Upon recognition of at least one object as the payload from the new potential candidate objects of interest, the payload is monitored frame by frame by the target tracker. Finally, the horizon detector may be used to identify the horizon line, distinguishing the sky and ground to compute the background motion and reduce false positives.

Figure 2B:
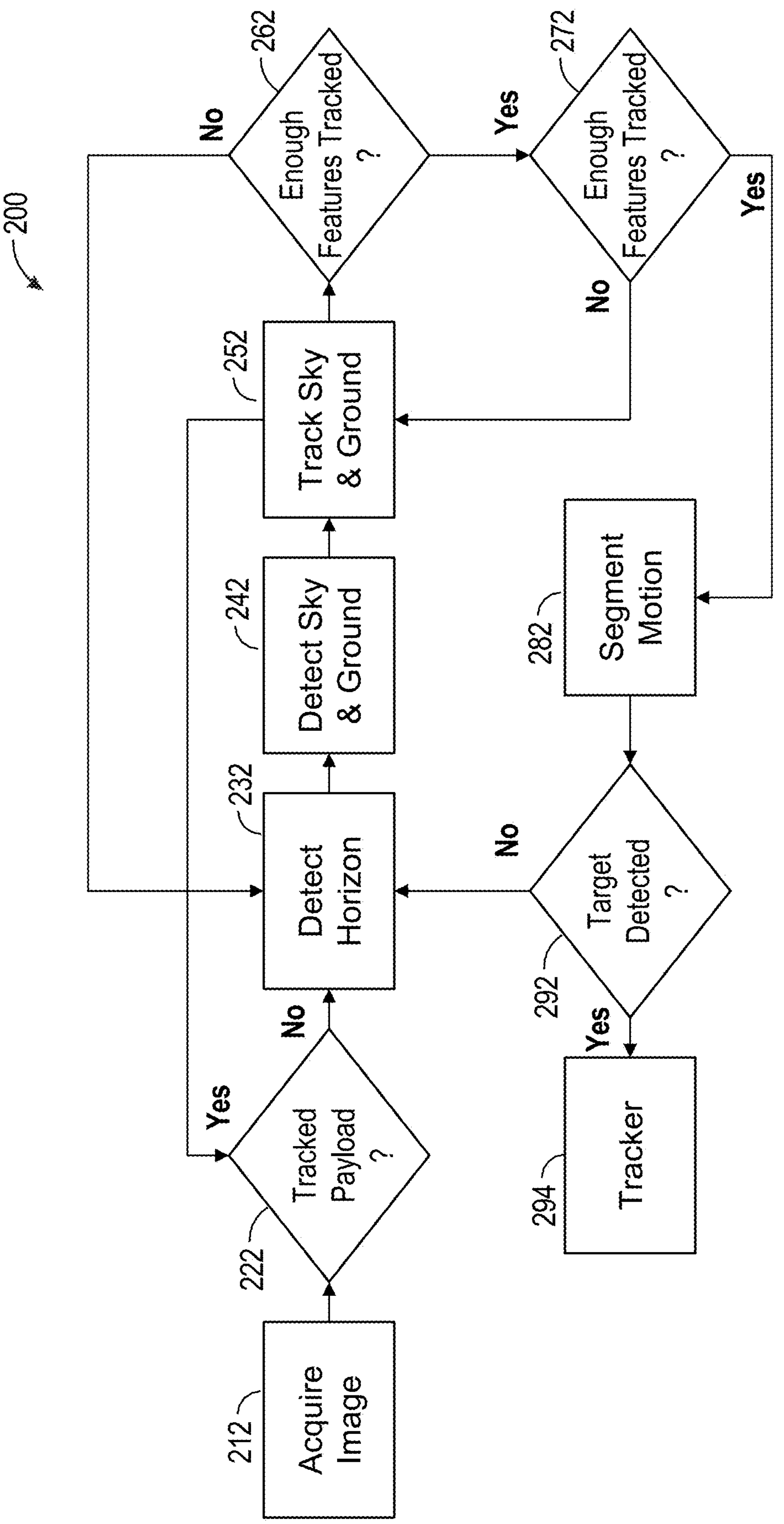
FIG. 2B illustrates a user interface configured for managing a variety of payloads for improved, or even optimized, UAV flight and payload operation or deployment, in accordance with one or more embodiments.

While the aforementioned examples are directed towards visually tracking a payload of interest, the general principles and examples may be used to intercept a moving object or target. When a target object is moving or hovering, the flow of FIG. 2A may be adapted to track targets that may be in-flight. Referring now to FIG. 2B, an exemplary adaptation to identifying a target of interest is provided. For targets of interest that may be airborne, a method for distinguishing the sky and ground 202 is provided. The system 202 may be initiated and an image acquired 210. The acquired image 210 verifies a tracked payload 222 has been previously acquired. If a tracked payload is confirmed, the acquired image 212 is processed by a tracker 252 to distinguish the sky from the ground. The output of the tracker 252 is run through a quality control to determine that enough features have been tracked 262. If enough features have not been tracked, a horizon detector 232 and sky & ground detector 242 are used to process the acquired image 212. If a target is detected above the horizon, the target is considered airborne. Such information may be useful when the altitude of a UAV changes and a target in a subsequent acquired image 212 indicates the target has landed, when in fact it may not have. A sufficient amount of data may be required to ensure a confidence level in the identity of the target and the position of the target in three-dimensional space. When the quality control to determine that enough features have been tracked 262 is approved, a second quality control process determines whether enough frames have been tracked 272. If sufficient frames have not been tracked, additional acquired images 212 may be requested and processed by the tracker 252. Upon confirming that enough frames have been tracked, a segment-motion sequence 282 may be performed. The segment-motion sequence 282 tracks the movement of the target relative to the sky and ground. Target detection 292 confirms the identity and location of the target and relays the target information to the tracker 294. If the target detection 292 fails to detect the target, the acquired image 212 or images may be reprocessed.

Figure 3:
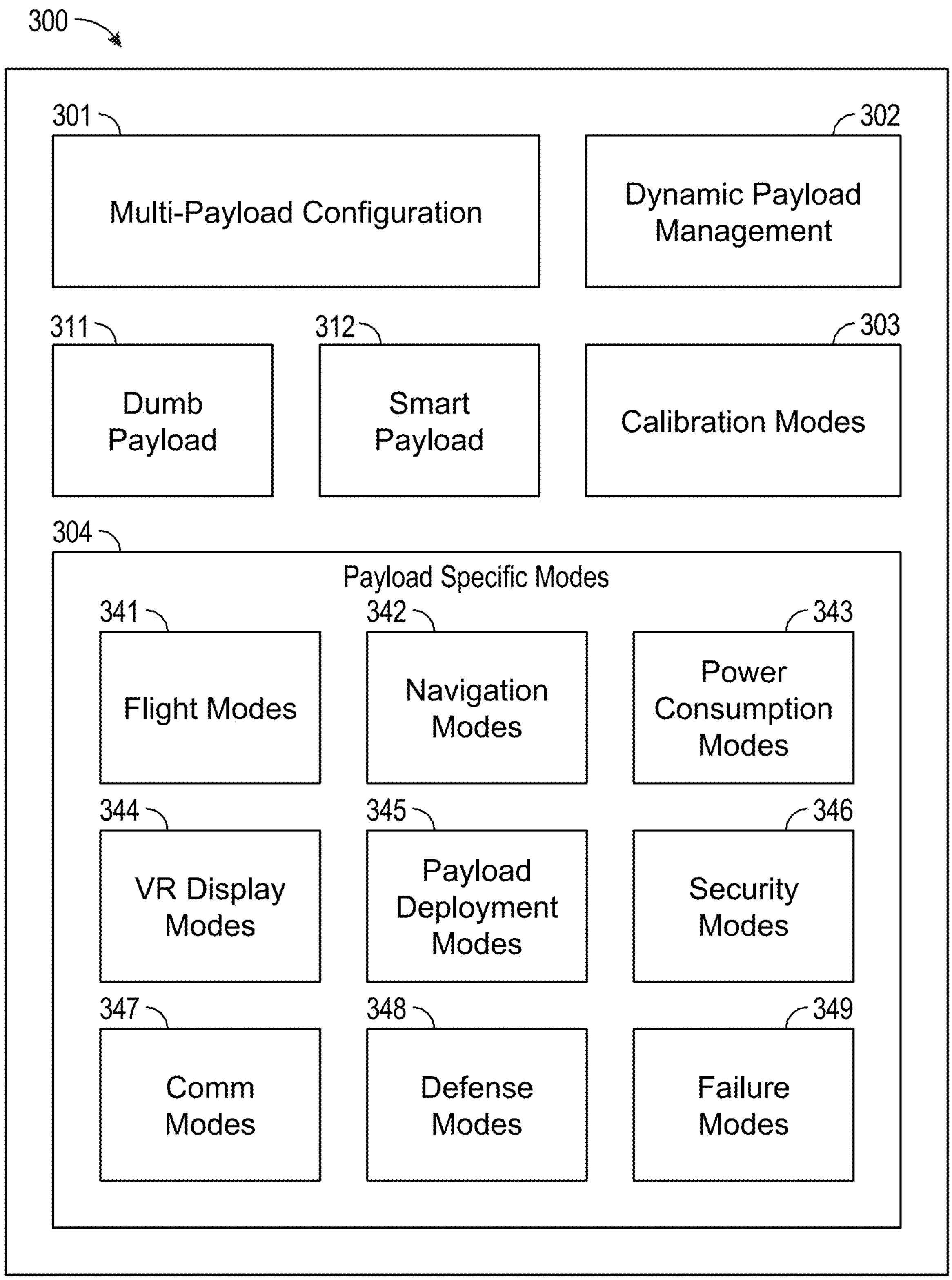
FIG. 3 illustrates a system configured for operating an unmanned aerial vehicle, in accordance with one or more embodiments.

Referring now to FIG. 3, a user interface 300 configured for managing a variety of payloads for improved, or even optimized, UAV flight and payload operation or deployment, is provided in accordance with one or more embodiments. A payload manager greatly enhances the physical and electronic features of a UAV platform, thus increasing the number of mission profiles that can be performed with a given platform. For example, a UAV's natural light, limited-zoom onboard cameras may be limited in their surveillance capabilities. With a payload manager, a UAV can enhance significantly the camera technology available to it via camera payloads, such as including 1080p video, infrared, high-speed, and sophisticated digital and optical zooming. A payload also could provide added battery life to a UAV to extend its range, or even provide a mechanism for a remote or a 3rd party to take temporary or permanent control of the UAV away from the primary operator.

User interface 300 for the payload manager provides an operator with status information regarding a particular UAV having a specific payload. The user interface 300 may comprise a multi-payload-configuration component 301, a dynamic payload-management component 302, a calibration-mode component 303, or a payload-specific-mode component 304.

The multi-payload configuration component 301 may comprise a dumb payload component 311 or a smart payload component 312 to view and alter a payload configuration associated with payload compatibility, communications, and activation. The dumb payload component 311 may provide information associated with a mechanical interface. The smart payload component 312 may provide information and control of a payload using a microcontroller interface, for example, a smart payload may control a camera (on/off, shutter operation, or settings) or include a default operation override for initiating a default mode if an error occurs with the payload. Examples of default modes include telling the drone to return to base, de-arming the payload, assuming an evasive flight mode, self-destruct, or erase data.

The dynamic-payload-management component 302 provides an operator with information and control of dynamic-payload characteristics including adjusting the flight envelope as weight changes; monitoring and adjusting arming status; hover travel using IMU or LiDAR sensors; coordinating with ground control or other drones; monitoring and adjusting power-consumption modes (e.g., surveillance camera power mode, high-speed flight mode, landing mode, or conserve power for data transmission mode). Low-data mode sends as little video as possible, automatically. A power-usage sensor may be used to analyze power consumption in real time. In some cases, a UAV may transmit full-size or reduced-size images, depending on available communications bandwidth.

The calibration-mode component 303 allows the UAV to sense weight and to adjust flight and navigation, and to adjust flight to account for acquisition and dropping of payloads. The calibration-mode component 303 also supports new algorithms for processing IMU sensor data, sensor fusion, extended Kalman filters (EKF), identification of an amount of travel to apply, calculations of hover travel, take off, hovering, landing, and weight calibration. One or more types of calibration may be supported including a minimum-throttle calibration, a localization calibration, and/or other calibrations. Localization calibration may include flying in a 1 meter (m) square to gauge weight and flight characteristic such as roll, pitch, and yaw during hovering and a short calibration flight. If a quick localization calibration fails to calibrate a drone, a longer calibration may be carried out, including for calibrating optics, throttle, etc.

The payload-specific-mode component 304 allows an operator to view status of and change configurations of one or more of payload-specific modes. These modes may include one or more of flight modes 341, navigation modes 342, power-consumption modes 343, VR display modes 344, payload-deployment modes 345, security modes 346, communication modes 347, defense modes 348, failure modes 349, and/or other modes. Flight modes 341 may include one or more of high/low-altitude, high/low-speed, night/day, and/or other flight modes. Navigation modes 342 may include one or more of road avoidance, drone avoidance, and/or other navigation modes. Power-consumption modes 343 may include one or more of battery-saver mode, speed mode, and/or other power-consumption modes. VR display modes 344 may include one or more of target centric, drone centric, payload centric; changing cameras, changing automatically, view selection UI, interception mode, end game, change-in-control dynamics, clear-display-but-for marker; edit presets, changing presets, and/or other VR display modes.

Payload-deployment modes 345 may include one or more of CBRN (chemical, biological, radiological, or nuclear), explosives, non-military, and/or other payload-deployment modes. Security modes 346 may include one or more of encryption/decryption, data processing and retransmission, zero-processing passthrough of packets, option to change encryption key, and/or other security modes. Communication modes 347 may include one or more of radio, microwave, 4G, 5G, infrared, laser, and/or other communication modes. Defense modes 348 may include one or more of camouflage, evasion, intercept, counterattack, self-destruct, and/or other defense modes. Failure modes 349 may include one or more of self-destruct, drop-payload, electromagnetic-pulse, and/or other failure modes. Modes may be user-defined, for example after an armed state is reached. Some implementations may include a programmable state machine, e.g., one in which a user can write a script that instructs a drone to do something new.

Figure 4:
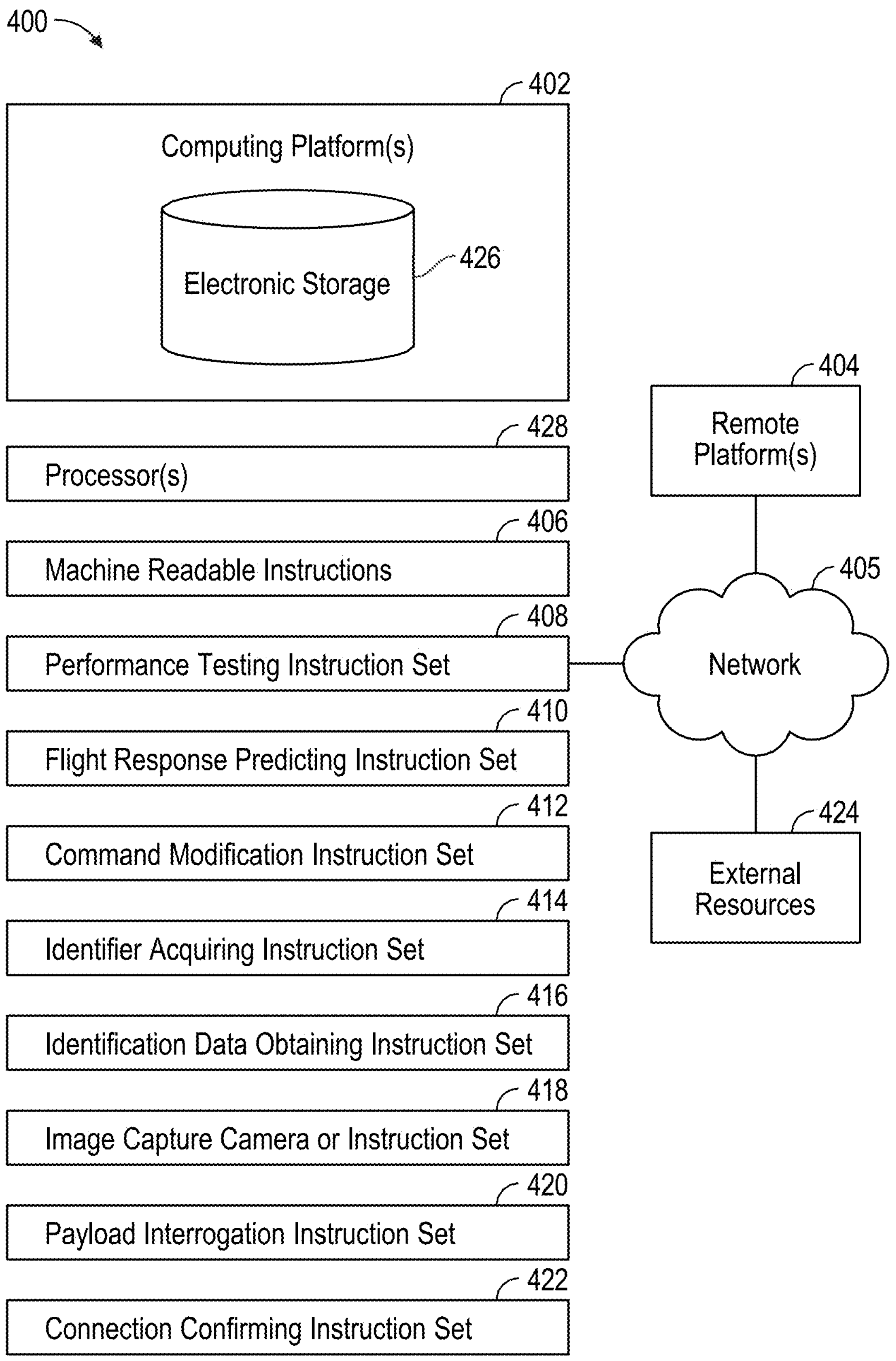
FIG. 4 illustrates a computing platform system for transmitting instructions to remote platforms, according to some embodiments of the present disclosure.

FIG. 4 illustrates a system 400 configured for operating a drone, for example an unmanned aerial vehicle, in accordance with one or more embodiments. In some embodiments, system 400 may include one or more computing platforms 402. Computing platform(s) 402 may be configured to communicate with one or more remote platforms 404 according to a client/server architecture, a peer-to-peer architecture, and/or other architectures. Remote platform(s) 404 may be configured to communicate with other remote platforms via computing platform(s) 402 and/or according to a client/server architecture, a peer-to-peer architecture, and/or other architectures. Users may access system 400 via remote platform(s) 404, e.g., a cloud architecture via Network 405.

Computing platform(s) 402 may be configured by machine-readable instructions 406. Machine-readable instructions 406 may include one or more instruction sets. The instruction sets may include computer programs. The instruction sets may include one or more of performance-testing instructions 408, flight-response-predicting instructions 410, command-modification instructions 412, identifier-acquiring instructions 414, identification-data-obtaining instructions 416, image-capture-device instructions 418, payload-interrogation instructions 420, connection-confirming instructions 422, and/or other devices or instruction sets.

Performance-testing instruction set 408 may be configured, e.g., to perform algorithmically testing during a takeoff. Following initiation of take-off, performance-testing instruction set 408 may monitor performance of the flight of the UAV via one or more algorithms to determine 1) a value corresponding to a mass of an attached payload; 2) roll, pitch, and yaw data during take-off; or 3) acceleration data during take-off. The algorithm may further compile flight data as training data for artificial-intelligence or machine-learning training to allow for better evaluation and control of future take-offs. Performing testing during a take-off command and monitoring performance of the UAV may include allowing the UAV to sense weight of the attached payload. The attached payload may include a mechanically attached dumb payload or a smart payload including processing capabilities such as a microcontroller, or sensors such as a payload camera.

In some embodiments, performing testing during the take-off command and monitoring performance of the UAV may include adjusting flight and navigation of the UAV while accounting for dropping one or more payloads. In some embodiments, performing testing during the take-off command and monitoring performance of the UAV may further include adjusting the flight envelope of the UAV based on received performance data. In some embodiments, performing testing during take-off, flight, landing, payload deployment, or other mission phase, and monitoring performance of the UAV, may further include monitoring and adjusting arming status of the UAV. In some embodiments, performing testing during a mission or a portion of a simulated mission and monitoring performance of the UAV may further include adjusting hover travel using an IMU/LiDAR sensor. In some embodiments, performing testing during flight and monitoring performance of the UAV may further include coordinating with at least one ground control station or other UAVs. In some embodiments, performing testing during flight and monitoring performance of the UAV may further include monitoring and adjusting power-consumption modes.

Flight-response-predicting instruction set 410 may be configured to 1) receive a flight command; 2) access an AI or a database of flight-response statistics relating to that flight command; and 3) predict a most likely flight response of the UAV to the flight command or to particular movements at one or more flight velocities.

Command-modification instruction set 412 may be configured to modify UAV commands received from a pilot using the predicted flight responses to ensure the UAV does not engage in unsafe maneuvers. Command-modification instruction set 412 also may be configured to modify UAV commands received from a pilot using the predicted flight responses and at least one characteristic of an associated payload to, e.g., achieve a certain flight mode, improve, or even optimize, flight performance, meet a mission objective, or deploy one or more payloads.

Identifier-acquiring instruction set 414 may be configured to acquire one or more coded or non-coded identifiers associated with the attached payload over a communications link using a payload adaptor configured to couple the payload to the UAV. The payload adaptor may include a communications link between the payload and a UAV microprocessor-based controller. At least one payload attribute may be communicated to the UAV microprocessor-based controller.

Identification-data-obtaining instruction set 416 may be configured to obtain identification data indicative of at least one characteristic of the attached payload using one or more coded or non-coded identifiers associated with the attached payload. A UAV may employ pattern recognition or machine vision to automatically recognize a payload by shape, size, or identifier symbol(s), and upon recognizing a payload as a known payload or type of payload, the UAV may initiate programming so that UAV performance is tailored to the specific payload. In other words, to augment the UAV's own controls and behavior to better serve the mission requiring the payload. Such augmentation may also include augmenting a UAV's own parameters as well, particularly if the payload has its own sensors and control/navigation capabilities. In one embodiment, once connected to the UAV, a payload may be permitted to override the navigation or other controls of the UAV, in effect acting as the control center for the UAV for that mission.

A UAV may be configured to identify the type of payload based on wireless signals from the payload (e.g., Wi-Fi®, cellular, Bluetooth®, active RFID tag) or a remote signal or third-party signal, such as a satellite or ground station connected to the payload. The UAV may be configured to use its own computer-vision capabilities via its camera system to identify a payload based on learned payloads, payload types, or payload archetypes, such as being able to determine that a certain structure is a payload containing first aid, or that a different payload structure contains food, or that yet another payload structure contains explosive ordnance. A UAV may also be configured to recognize if a payload is "dumb" in that it does not have sophisticated sensors, significant data-processing capability, or other connectivity options found in "smart" payloads.

There may be multiple payloads attached to a UAV, and thus multi-payload identification and recognition is important. For example, a total payload could include or consist of an extra battery to extend the range of a UAV flying a large first-aid kit to a nearby location.

In accordance with various embodiments, a human operator could be given an interface to confirm the initial identification of the payload by the UAV or override a UAV's decision based on visual inspection or other environmental clues. For example, a UAV may not recognize a particular payload, but if the human operator knows that the UAV is required to pick up whatever is in a certain room, and the only item in the room looks like it could be picked up by a UAV, then the UAV could be directed to pick up such an object.

Verification is important in payload identification in that a compromised payload could in turn compromise a UAV and the overall mission. Thus, visual and electronic confirmation that a payload is indeed approved and safe may be important. Much of this verification may occur via the physical and electronic connectivity between a UAV and the UAV's payload (e.g., user confirmation, encrypted communications, exchange of trusted keys, etc.).

The more sophisticated the payload-identification process is, the more likely machine learning or other classification technology is used. For example, if a UAV (or other system or device) has classified a payload as explosive, then the UAV may be able to initiate a quick-release option in case the UAV's own onboard sensors indicate that the payload is vibrating heavily, increasing in temperature, or indicating that it may explode. Similarly, a UAV may be able to recognize that a payload has an external Global Positioning System (GPS) antenna and thus can work to synchronize that antenna to provide the UAV with redundant GPS capability, or perhaps increased GPS accuracy. Depending on the level of identification possible, a UAV might also recognize that once a given payload is dropped, the UAV's weight decreases by some amount, say 10%, thus allowing a longer, safer return path than the one used to deliver the payload. As it makes those critical decisions, the UAV could send its preliminary conclusions to a human operator for confirmation, or at least send the human operator a cue that it has made a decision that will stand unless overridden by the operator.

Image capture instruction set 418 may be configured to capture one or more payload images of the attached payload using, e.g., a UAV camera, a payload-adaptor camera, or a payload camera. One or more images of the attached payload may be used in obtaining identification data indicative of at least one characteristic of the attached payload. Payload image data may be provided to the UAV over the communications link.

Payload-interrogation instruction set 420 may be configured to interrogate the attached payload with an authentication protocol based at least in part on payload-identification data received from the attached payload.

Connection-confirming instruction set 422 may be configured to confirm a mechanical, electrical, or optical connection between the UAV and an attached payload. By way of non-limiting example, at least one of a visual confirmation of the mechanical connection, an electrical connection with the mechanical connection, a wireless connection between the UAV and the attached payload, and/or a make/break connection between the UAV and the attached payload may be determined. In some embodiments, payload data also may be transmitted to at least one ground control station. The mechanical connection may be done via an adaptor such as an electromechanical harness that is an intermediary layer between the UAV and the payload. In accordance with various embodiments, the harness may be a fixed attachment to the UAV, or it may be a removable attachment to the UAV. The harness also may be configured to attach to the payload, and then to release the payload but stay attached to the UAV after the payload is released. In some embodiments, the adaptor may include a "smart harness" that integrates sensor data from the UAV and the payload to help with navigation and mission-centric decisions.

Effective payload attachment may be closely tied to connectivity, for example the method by which connectivity happens. Important data regarding decisions around the attachment and release of the payload may be transferred to the payload through the payload-attachment harness and via the payload-connectivity options discussed above.

In some embodiments, the payload microcontroller may provide a default operation override if an error occurs. In some embodiments, by way of non-limiting example, a UAV may operate in one or more flight modes, one or more navigation modes, one or more power consumption modes, a VR display mode, one or more attached-payload deployment modes, and one or more security modes. In some embodiments, by way of non-limiting example, the one or more flight modes may include a high/low altitude mode, a high/low speed mode, and night/day mode. In some embodiments, the one or more navigation modes may include a road-avoidance mode and a UAV avoidance mode. In some embodiments, the one or more power-consumption modes may include a battery-saver mode and a speed mode. In some embodiments, by way of non-limiting example, the VR display mode may include a target-centric mode, a UAV centric mode, a payload-centric mode, a changing-cameras mode, a changing-automatically mode, a view-selection UI mode, an interception mode, an end-game mode, a change-in-control-dynamics mode, a clear-display-but-for-marker mode, an edit-presets mode, and a changing-presets mode. In some embodiments, by way of non-limiting example, the one or more attached-payload-deployment modes may include a CBRN mode, an explosives mode, and non-military-payload mode.

In some embodiments, by way of non-limiting example, one or more security modes may include and an encryption/decryption mode, a data-processing-and-retransmission mode, a zero-processing-passthrough-of-packets mode, and an option-to-change-encryption-key mode.

In some embodiments, computing platform(s) 402, remote platform(s) 404, and/or external resources 424 may be operatively connected via one or more electronic communication links. For example, such electronic communication links may be established, at least in part, via a network such as the Internet, mesh networks, ad-hoc networks, LANs, WANs, or other networks. It will be appreciated that this is not intended to be limiting, and that the scope of this disclosure includes embodiments in which computing platform(s) 402, remote platform(s) 404, and/or external resources 424 may be operatively linked via some other communication media.

A given remote platform 404 may include one or more processors configured to execute computer-program instruction sets. The computer-program instruction sets may be configured to enable a pilot, expert, or user associated with the given remote platform 404 to interface with system 400 and/or external resources 424, and/or provide other functionality attributed herein to remote platform(s) 404. By way of a non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms.

External resources 424 may include sources of information outside of system 400, external entities participating with system 400, and/or other resources. In some embodiments, some or all of the functionality attributed herein to external resources 424 may be provided by resources included in system 400.

Computing platform(s) 402 may include electronic storage 426, one or more processors 428, and/or other components. Computing platform(s) 402 may include communication lines, or ports to enable the exchange of information with a network and/or other computing platforms. Illustration of computing platform(s) 402 in FIG. 4 is not intended to be limiting. Computing platform(s) 402 may include a plurality of hardware, software, and/or firmware components operating together to provide the functionality attributed herein to computing platform(s) 402. For example, computing platform(s) 402 may be implemented by a cloud of computing platforms operating together as computing platform(s) 402.

Electronic storage 426 may comprise non-transitory storage media that electronically stores information. The electronic storage media of electronic storage 426 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by processor(s) 428, information received from computing platform(s) 402, information received from remote platform(s) 404, and/or other information that enables computing platform(s) 402 to function as described herein.

Processor(s) 428 may be configured to provide information-processing capabilities in computing platform(s) 402. As such, processor(s) 428 may include one or more of a digital processor, an analog processor, a digital circuit designed to process information, an analog circuit designed to process information, a state machine, and/or other mechanisms for electronically processing information. Although processor(s) 428 is (are) shown in FIG. 4 as a single entity, this is for illustrative purposes only. In some embodiments, processor(s) 428 may include a plurality of processing units. These processing units may be physically located within the same device, or processor(s) 428 may represent processing functionality of a plurality of devices operating in coordination. Processor(s) 428 may be configured to execute instruction sets 408, 410, 412, 414, 416, 418, 420, and/or 422, and/or other instruction sets. Processor(s) 428 may be configured to execute instruction sets 408, 410, 412, 414, 416, 418, 420, and/or 422, and/or other instruction sets by software; hardware; firmware; some combination of software, hardware, and/or firmware; and/or other mechanisms for configuring processing capabilities on processor(s) 428. As used herein, the term "instruction set" may refer to any component or set of components that perform the functionality attributed to the instruction set. This may include one or more physical processors during execution of processor-readable instructions, the processor-readable instructions themselves, circuitry, hardware, storage media, or any other components.

It should be appreciated that although the programs or instruction sets 408, 410, 412, 414, 416, 418, 420, and/or 422 and their associated hardware and algorithms are illustrated in FIG. 4 as being implemented within a single processing unit, in embodiments in which processor(s) 428 includes multiple processing units, one or more of instruction sets 408, 410, 412, 414, 416, 418, 420, and/or 422 may be implemented remotely from the other instruction sets. The description of the functionality provided by the different instruction sets 408, 410, 412, 414, 416, 418, 420, and/or 422 described below is for illustrative purposes, and is not intended to be limiting, as any of instruction sets 408, 410, 412, 414, 416, 418, 420, and/or 422 may provide more or less functionality than is described. For example, one or more of instruction sets 408, 410, 412, 414, 416, 418, 420, and/or 422 may be eliminated, and some or all of its (their) functionality may be provided by other ones of instruction sets 408, 410, 412, 414, 416, 418, 420, and/or 422. As another example, processor(s) 428 may be configured to execute one or more additional instruction sets that may perform some or all of the functionality attributed below to one of instruction sets 408, 410, 412, 414, 416, 418, 420, and/or 422.

FIGS. 5A, 5B, 5C, 5D, and/or 5E illustrates a method 500 for operating an unmanned aerial vehicle, in accordance with one or more embodiments. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIGS. 5A, 5B, 5C, 5D, and/or 5E and described below is not intended to be limiting.

In some embodiments, the method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 400.

Figure 5A:
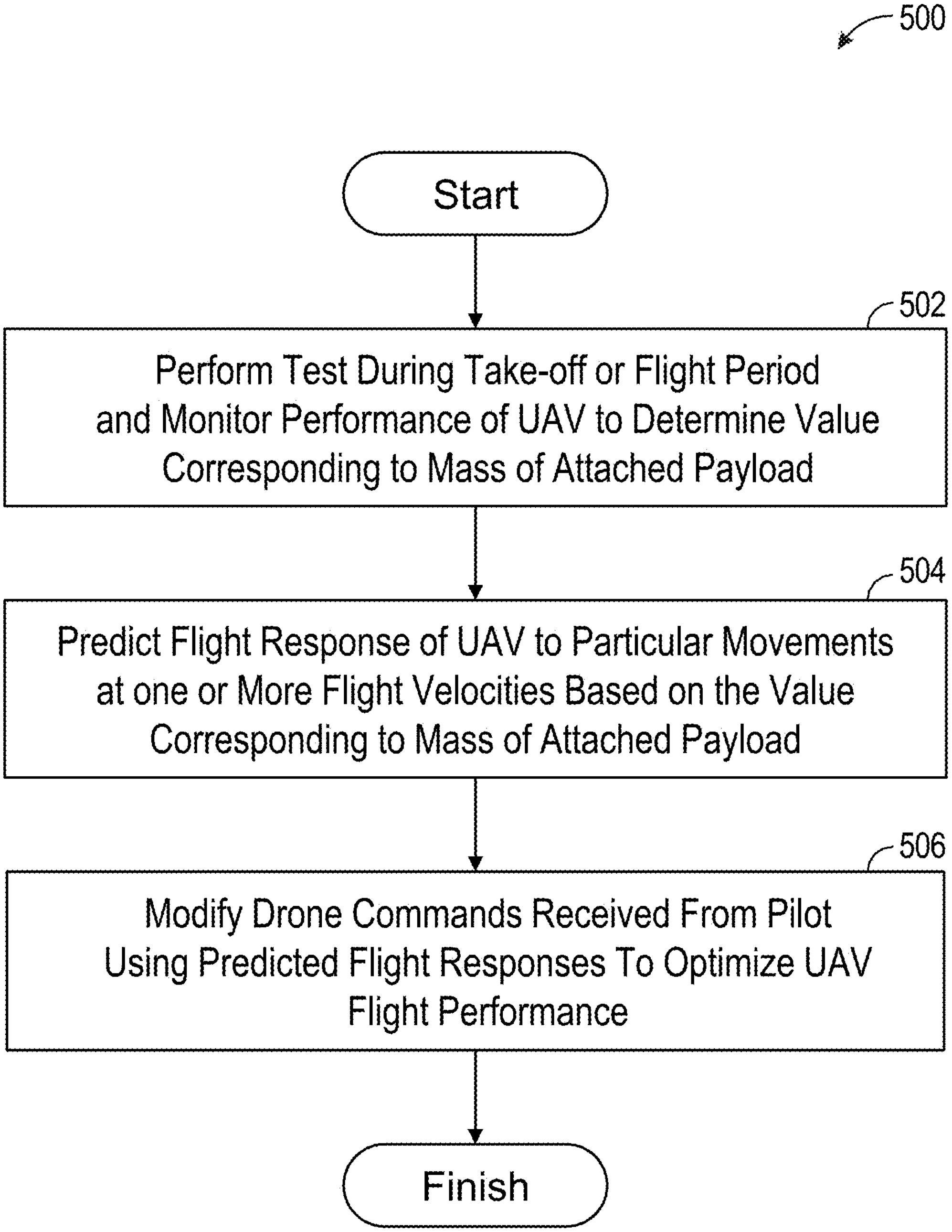
FIGS. 5A, 5B, 5C, 5D, and/or 5E illustrate a method for operating an unmanned aerial vehicle, in accordance with one or more embodiments.

FIG. 5A illustrates method 500, in accordance with one or more embodiments.

An operation 502 may include performing testing during take-off, flight, or landing, and monitoring performance of the UAV to determine a value corresponding to a mass of an attached payload. Operation 502 may be performed by one or more hardware processors configured by machine-readable instructions including an instruction set that is the same as or similar to performance-testing instruction set 408, in accordance with one or more embodiments.

An operation 504 may include predicting a flight response of the UAV to particular movements at one or more flight velocities. Operation 504 may be performed by one or more hardware processors configured by machine-readable instructions including an instruction set that is the same as or similar to flight-response-predicting instruction set 410, in accordance with one or more embodiments.

Figure 5B:
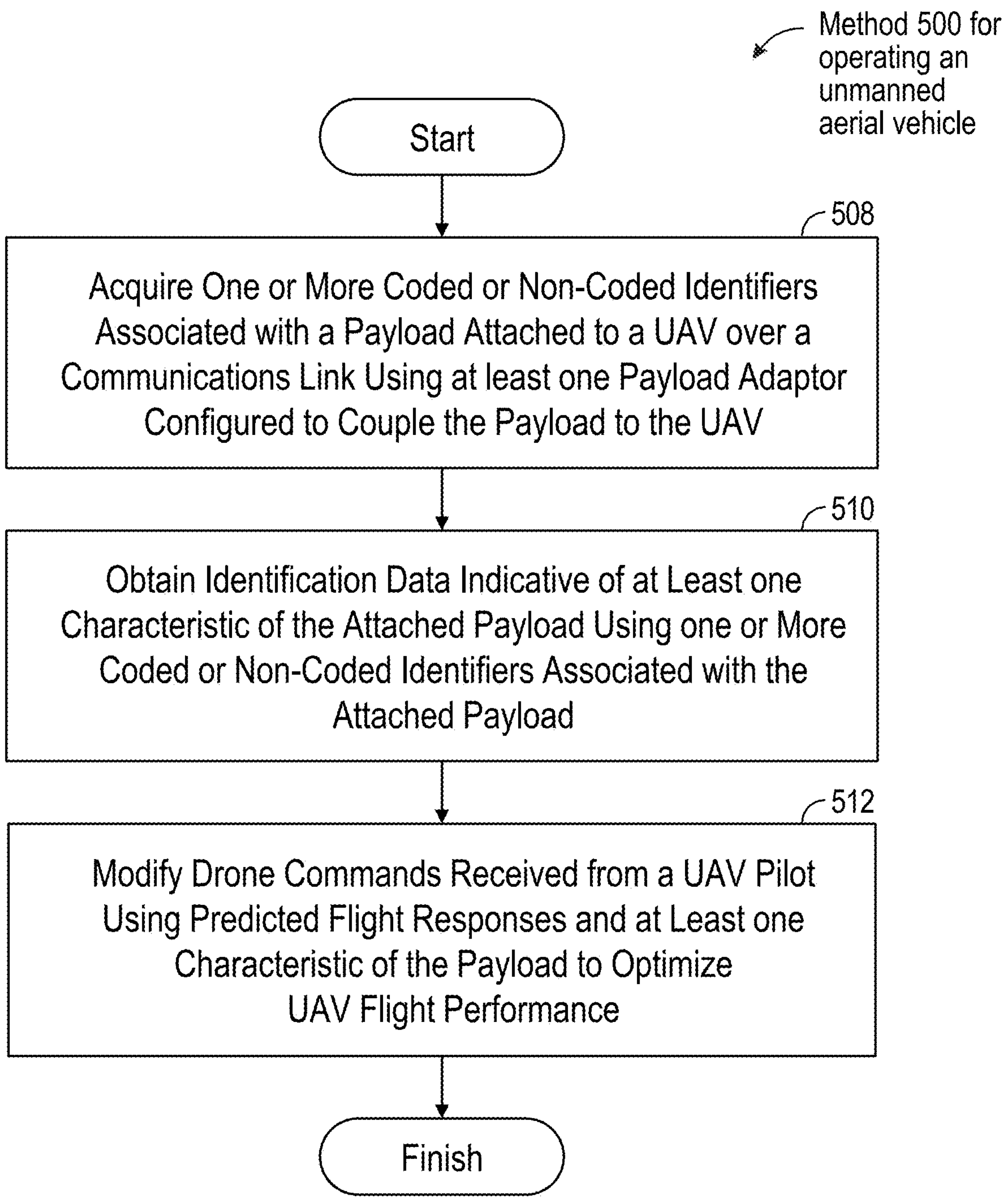

An operation 506 may include modifying UAV commands received from a pilot using the predicted flight responses to reduce the likelihood, or to ensure, that the UAV does not engage in unsafe maneuvers. Operation 506 may be performed by one or more hardware processors configured by machine-readable instructions including an instruction set that is the same as or similar to the command-modification instruction set 412, in accordance with one or more embodiments. FIG. 5B illustrates method 500, in accordance with one or more embodiments.

An operation 508 may include acquiring one or more coded or non-coded identifiers associated with the attached payload over a communications link using a payload adaptor configured to couple the payload to the UAV. A payload adaptor may include the communications link between the payload and a UAV microprocessor-based controller. Operation 508 may be performed by one or more hardware processors configured by machine-readable instructions including an instruction set that is the same as or similar to the identifier-acquiring instruction set 414, in accordance with one or more embodiments.

An operation 510 may include obtaining identification data indicative of at least one characteristic of the attached payload using one or more coded or non-coded identifiers associated with the attached payload. Operation 510 may be performed by one or more hardware processors configured by machine-readable instructions including an instruction set that is the same as or similar to the identification-data-obtaining instruction set 416, in accordance with one or more embodiments.

An operation 512 may include modifying UAV commands received from a pilot using the predicted flight responses and the at least one characteristic of the payload to reduce the chances, or ensure, that the UAV is able to complete its mission, fly as instructed, or engage in safe maneuvers (or to increase the chances that, or to ensure, that the UAV does not engage in unsafe maneuvers). Operation 512 may be performed by one or more hardware processors configured by machine-readable instructions including an instruction set that is the same as or similar to the command-modification instruction set 512, in accordance with one or more embodiments.

Figure 5C:
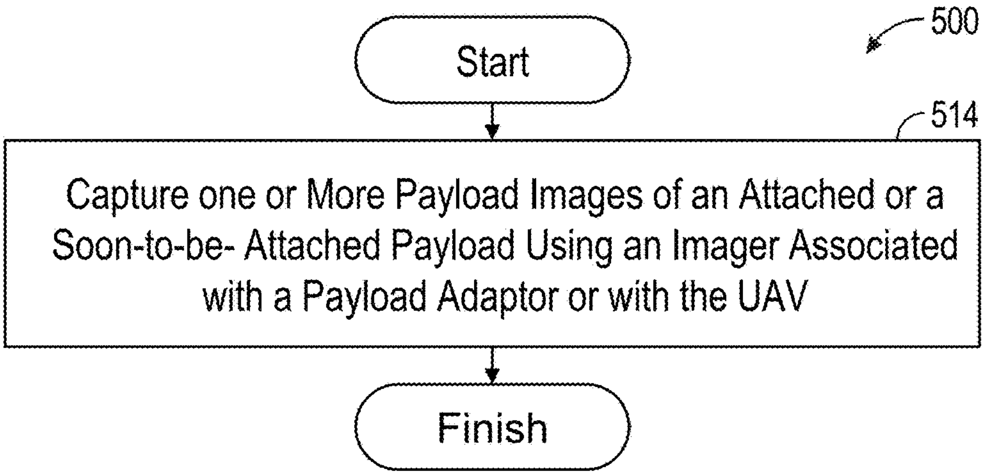

FIG. 5C illustrates method 500, in accordance with one or more embodiments. An operation 514 may include capturing one or more payload images of the attached payload using a UAV imager, a payload-adaptor imager, or a payload imager. One or more images of the attached payload may be utilized in obtaining identification data indicative of at least one characteristic of the attached payload. Operation 514 may be performed by one or more hardware processors configured by machine-readable instructions including an instruction set that is the same as or similar to image-capture instruction set 418, in accordance with one or more embodiments.

Figure 5D:
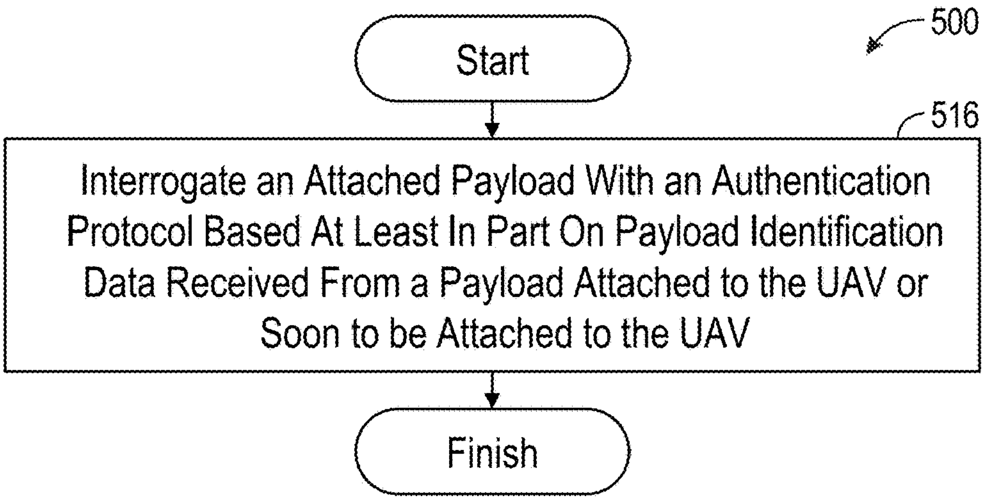

FIG. 5D illustrates method 500, in accordance with one or more embodiments. An operation 516 may include interrogating the attached payload with an authentication protocol based at least in part on payload-identification data received from the attached payload. Operation 516 may be performed by one or more hardware processors configured by machine-readable instructions including an instruction set that is the same as or similar to payload-interrogation instruction set 420, in accordance with one or more embodiments.

Figure 5E:
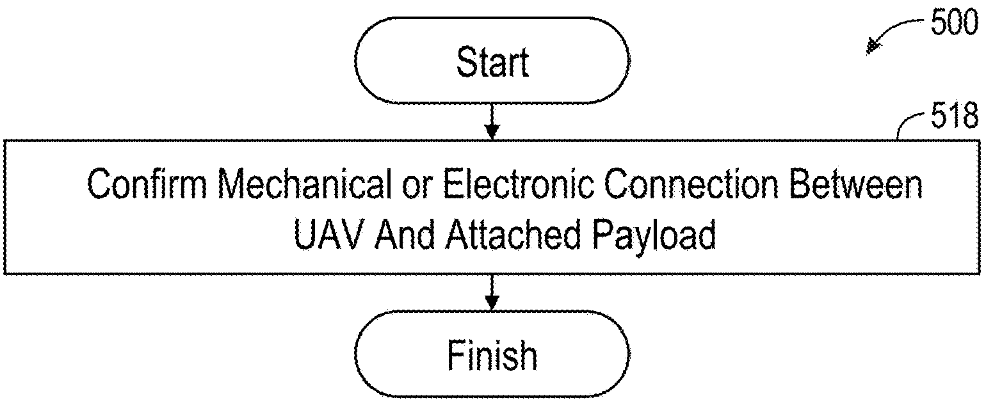

FIG. 5E illustrates method 500, in accordance with one or more embodiments. An operation 518 may include confirming a mechanical connection between the UAV and an attached payload. Operation 518 may be performed by one or more hardware processors configured by machine-readable instructions including an instruction set that is the same as or similar to the connection-confirming instruction set 422, in accordance with one or more embodiments.

Figure 6:
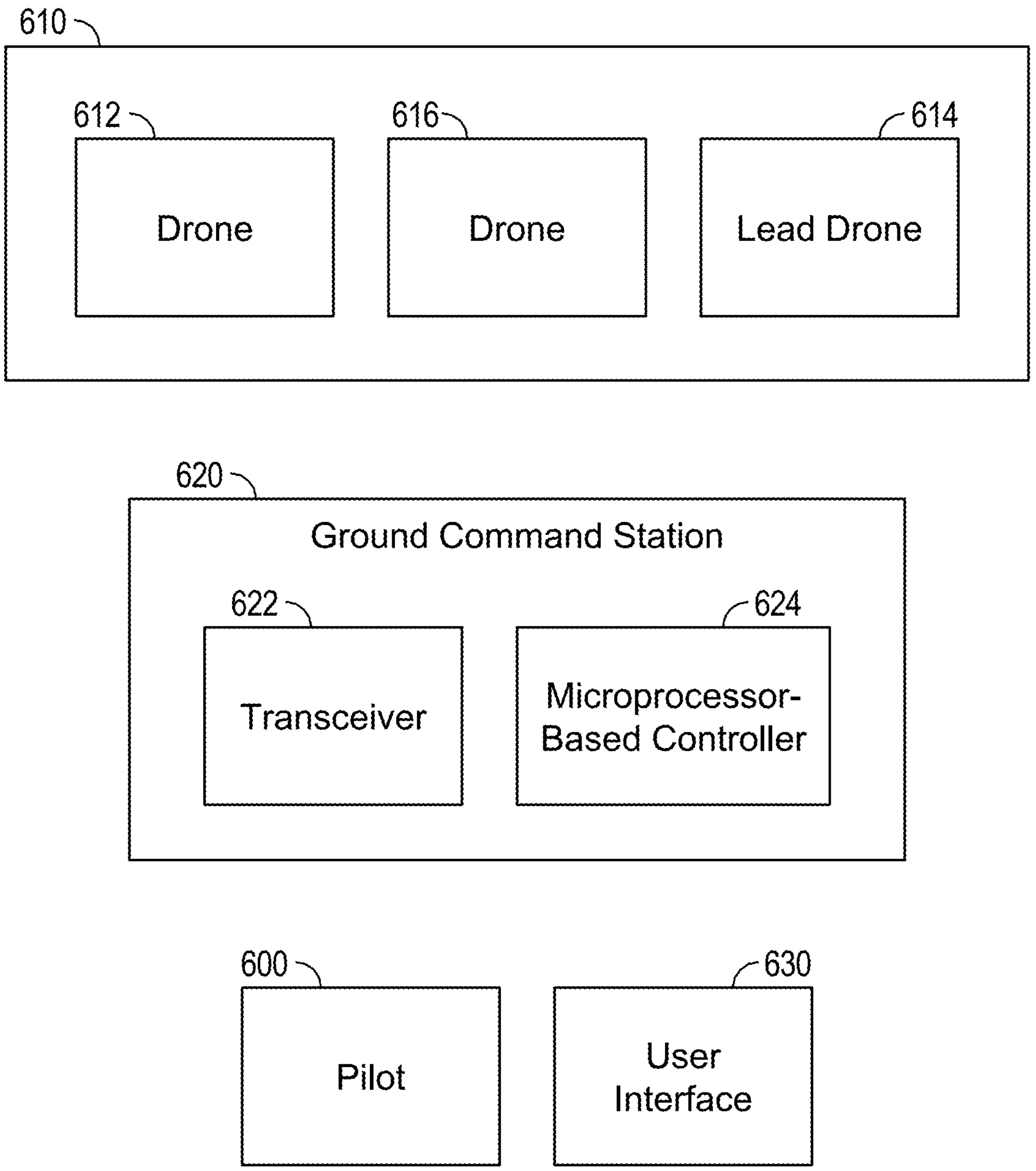
FIG. 6 is a block diagram illustrating a plurality of drones, according to some embodiments of the present disclosure.

FIG. 6 depicts a plurality of drones 610 configured to augment a pilot performance, according to some embodiments of the present disclosure. In one embodiment, a ground command station 620 may include a transceiver 722 in communication with a fleet of drones 610 and a user interface 630 for accepting pilot 600 commands. The ground command station 620 may include a microprocessor-based controller 624 for storing instructions to manage the pilot's 600 workload in managing the fleet 610. For example, the fleet 610 may include a lead drone 614 which is actively controlled by the pilot. In addition to receiving active instructions, the lead drone 614 may transmit contextual information with regard to the environment via a FPV feed or sensor information. The FPV feed or sensor information may be prominently displayed on the user interface 630 as the pilot 600 completes a task. While the pilot completes a task with the lead drone 614, the operating system stored in memory on the microprocessor-based controller may alter operational instructions to accessory drone 612 and 616.

In some embodiments, the ground command station 620 is operable to execute, for example and without limitation, the following operational instructions: associating, recognizing, or otherwise assigning the fleet 610 of drones as group members within a group membership; designating at least one drone from the plurality of drones with a lead drone 614 designation within the group membership; designating at least one drone from the drones 612 and 616 as a follower drone within the group membership; receiving a lead-drone flight command initiated by the user 600; determining at least one follower flight-path instruction for the at least one follower drone 612 and 614 based at least in part on the lead drone 614 flight command; and transmitting, via the transceiver 622, at least one follower flight-path instruction to at least one follower drone 612 and 614 within the group membership.

Figure 7:
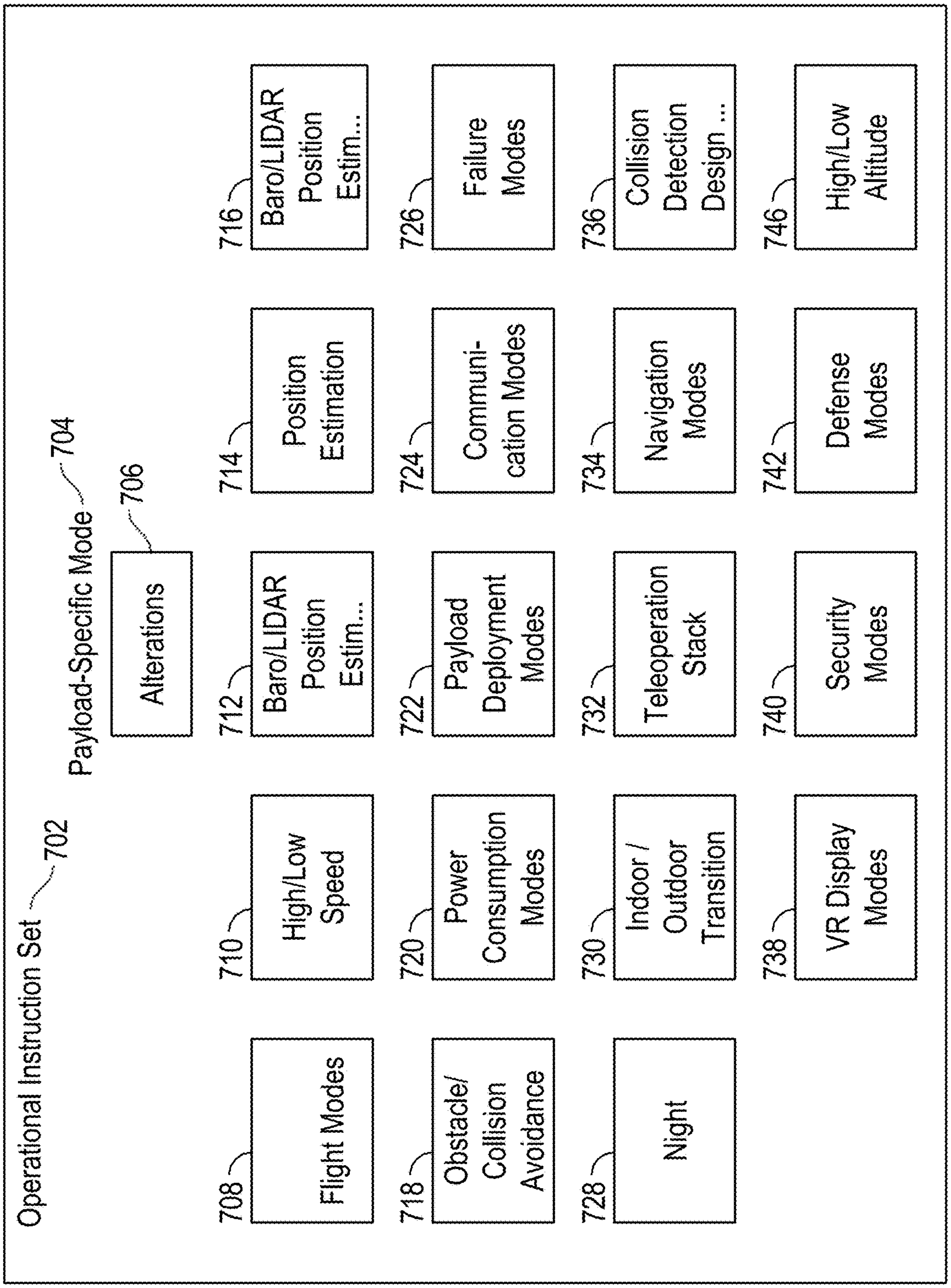
FIG. 7 is a block diagram illustrating an exemplary operation instruction set, according to some embodiments of the present disclosure.

Referring now to FIG. 7, a block diagram of an exemplary operational instruction set 702 is provided according to some embodiments of the present disclosure. An operational instruction 702 may be informed by a drone context. In some embodiments, the drone context may include one or more of a UAV operating status, a system capability for modifying the executable flight instructions, a payload-armed status, an authentication status, a group membership, a lead-UAV status, a follower-UAV status, a mission status, a mission objective, engagement in an automated operational-instruction command, a maintenance-alert status, a reduced operational capacity, a maximum range, and a battery-life status, an indoor/outdoor flight transition, an environmental low-visibility status, a high-wind status, an air-pollutant status, a chemical-presence status, a munitions status, a high-electromagnetic-radiation alert, a humidity status, a temperature-alert status, a detected audible alert, or a ground-truth reading, and the Inertial Measurement Unit (IMU) data. A drone context, for example, an environmental low-visibility status, may impact a minimum ground height a follower drone 612 may receive as an operational instruction.

In one embodiment, the operational instructions 702 may include, but are not limited to, one or more of the following:

a. Flight modes 708
b. High/low speed 710
c. Night 728/day
d. Baro/LIDAR Position Estimation Fusion 712
e. Indoor/Outdoor Transition 730
f. Position Estimation 714 during Indoor/Outdoor transition
g. Teleoperation Stack 732
h. Baro/LIDAR Position Estimation Fusion 716
i. Obstacle/Collision Avoidance 718
j. Collision Detection Design Document 736
k. High/low altitude 746.

In one embodiment, the operational instructions 702 may also include a payload-specific mode of operation, or modes, e.g., a payload-specific mode 704. These modes may include, but are not limited to, the following:

a. Navigation modes 734, e.g., road avoidance, drone avoidance
b. Power-consumption modes 720—battery-saver mode, speed mode
c. VR display modes 738—e.g., target centric, drone centric, payload centric
d. Payload-deployment modes 722—chemical, biological, radiological, and nuclear (CBRN), explosives, non-military
e. Security modes 740—encryption/decryption, data processing and retransmission, zero processing pass-through of packets
f. Communication modes 724—radio, microwave, 4G, 5G
g. Defense modes 742—camouflage, evasion, intercept, counterattack, self-destruct
h. Failure modes 726—self-destruct, drop payload, electromagnetic pulse
i. Transmitting a video feed to a Visual Guidance Computer (VGC)
j. Initializing a queuing system and a visual tracker.
k. Transmitting a video feed to the Visual Guidance Computer (VGC) and the visual tracker l. Receiving a configuration package may associate a burdened (i.e., laden) flight profile with a payload.
m. The payload-specific modes 704 may include alterations 706 to those depending on weather conditions, power considerations, communications quality, or other operating conditions.

Figure 8:
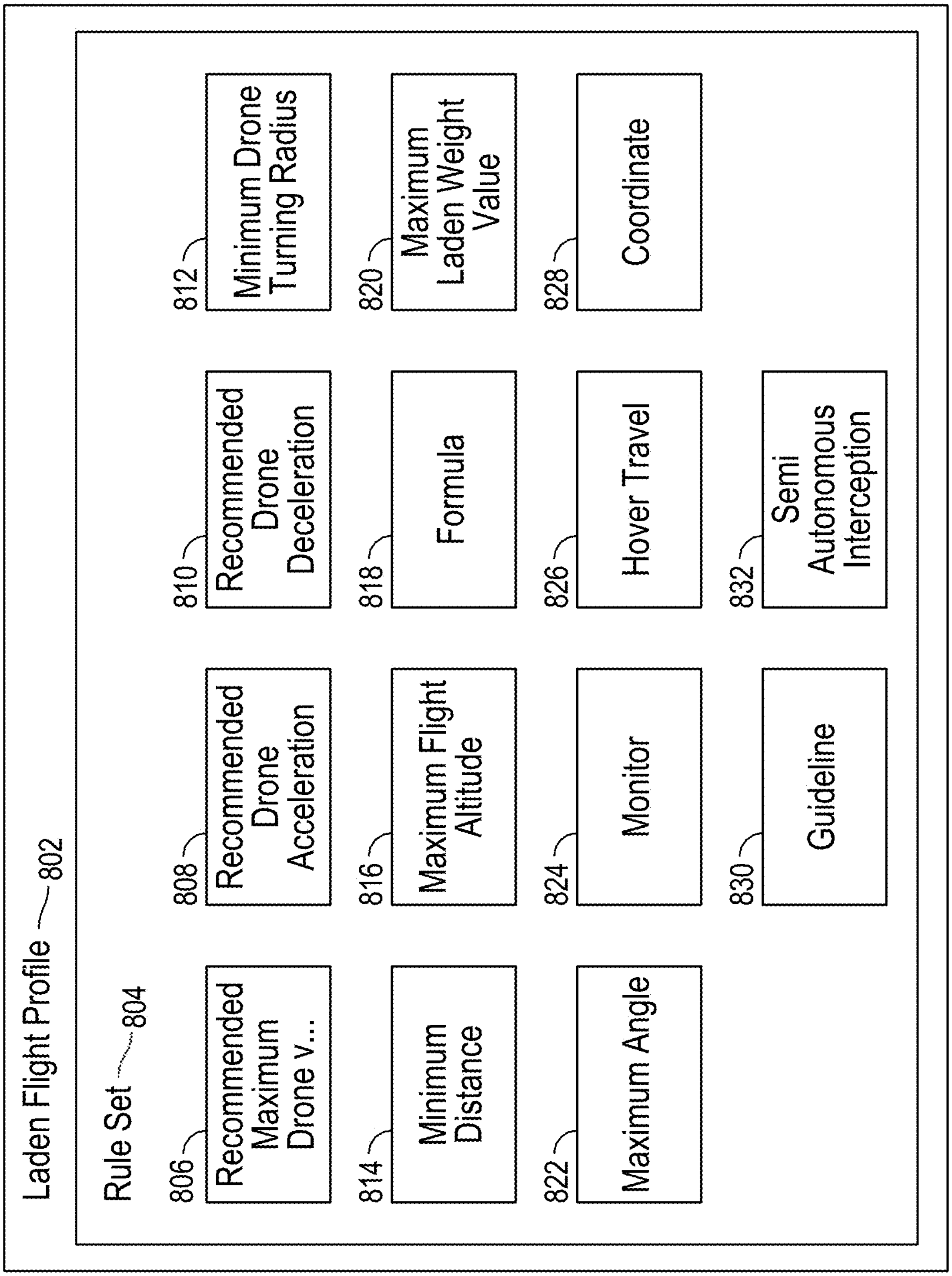
FIG. 8 is a block diagram illustrating an exemplary laden-flight profile set, according to some embodiments of the present disclosure.

Operational instructions may be modified based on a context of the drone. Non-limiting examples of contextual information are described with respect to FIG. 1A. Context of a drone may be particularly important when managing payloads, as the context may dramatically impact the drone flight profile. Referring now to FIG. 8, an example rule set 804 for a drone context of a laden-flight profile 802 is provided. In one embodiment, the laden-flight profile 802 may include a rule set for informing the laden-flight profile based on one or more of:

a. The rule set 804 may include a recommended maximum drone velocity 806.
b. A recommended drone acceleration 808.
c. A recommended drone deceleration 810.
d. A minimum drone turning radius 812.
e. A minimum distance 814 from an object in a flight path.
f. A maximum flight altitude 816.
g. A formula 818 for calculating a maximum safe distance.
h. A maximum laden weight value 820.
i. A maximum angle 822 one or more axis of an in-flight drone command.
j. A monitor 824 and adjust-arming status.
k. A hover travel 826 based at least in part on an IMU or LIDAR sensor.
l. A coordinate 828 with ground control and other drones.
m. One or more guidelines 830 to modify one or more pilot input parameters.
n. A semi-autonomous interception 832 of the payload or target (See Payload Identification)

Figure 9:
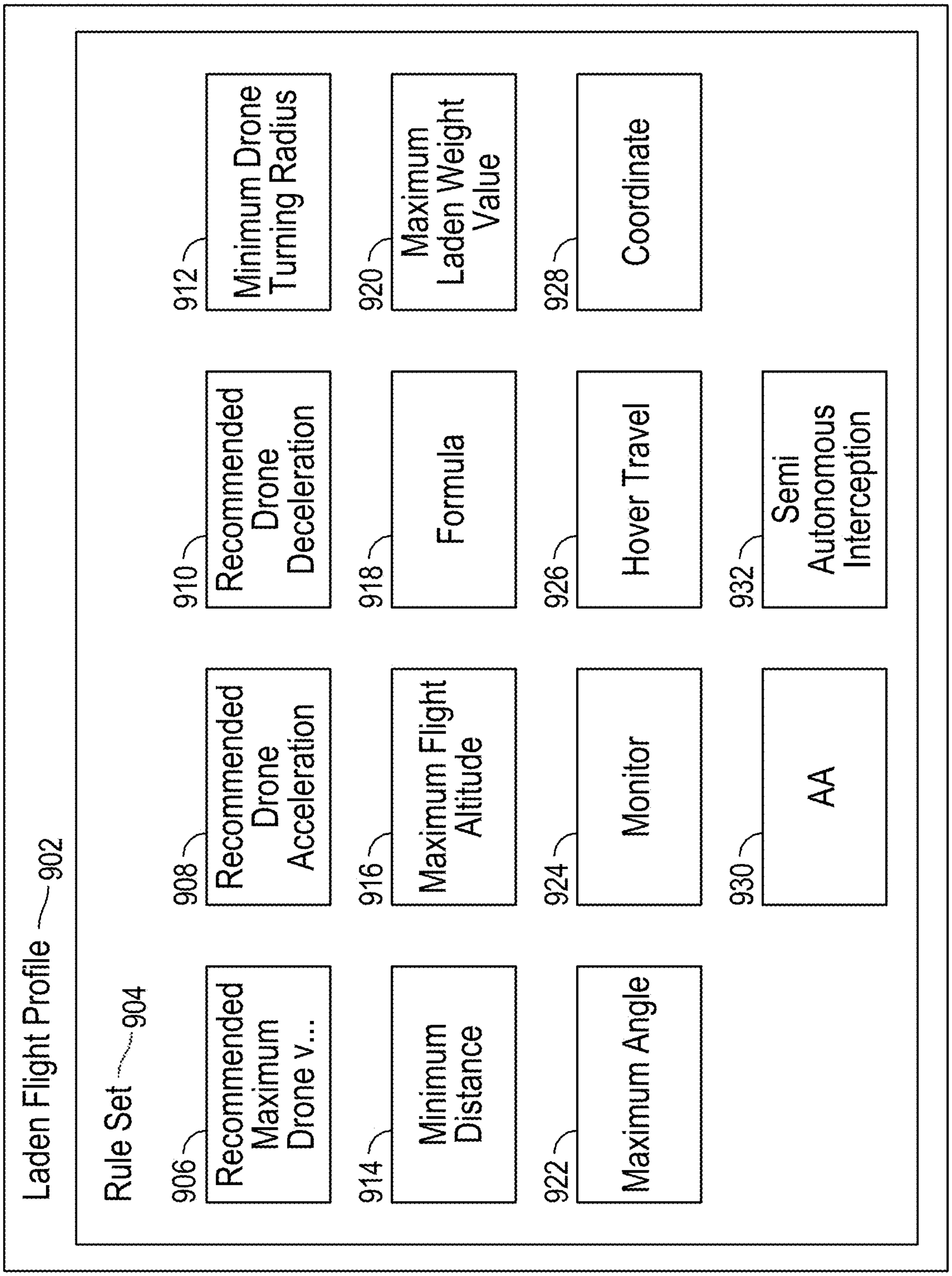
FIG. 9 is a block diagram illustrating another exemplary laden-flight profile set, according to some embodiments of the present disclosure.

FIG. 9 depicts a second exemplary laden-flight profile 902, according to some embodiments of the present disclosure. In one embodiment, the laden-flight profile 902 may include a rule set 904 for informing the laden-flight profile based on one or more of the following:

a. A recommended maximum drone velocity 906
b. A recommended drone acceleration 908
c. A recommended drone deceleration 910
d. A minimum drone turning radius 912
e. A minimum distance 914 from an object in a flight path
f. A maximum flight altitude 916
g. A formula 918 for calculating a maximum safe distance
h. A maximum laden weight value 920
i. A maximum angle 922 one or more axis of an in-flight drone command
j. A monitor 924 and adjust-arming status
k. A hover travel 926 based at least in part on an IMU or LIDAR sensor
l. A coordinate 928 with ground control and other drones, "aa" 930
m. Monitor-and-adjust power-consumption modes, and semi-autonomous interception 932

Laden-flight profiles 902 may serve multiple functions and goals, although safety of the drone and potential bystanders may be an important goal. As in the example of a UAV, as the drone transitions from an unladen-to a laden-flight profile, the flight capabilities may change. These capabilities may range from flight-performance capabilities like a maximum drone velocity 906 or a minimum drone turning radius 912, other performance capabilities like maximum range are also impacted. By incorporating laden-flight profiles 902, the payload manager operating system can support the pilot in adjusting the pilot-initiated commands into operational instructions for a laden drone.

Figure 10:
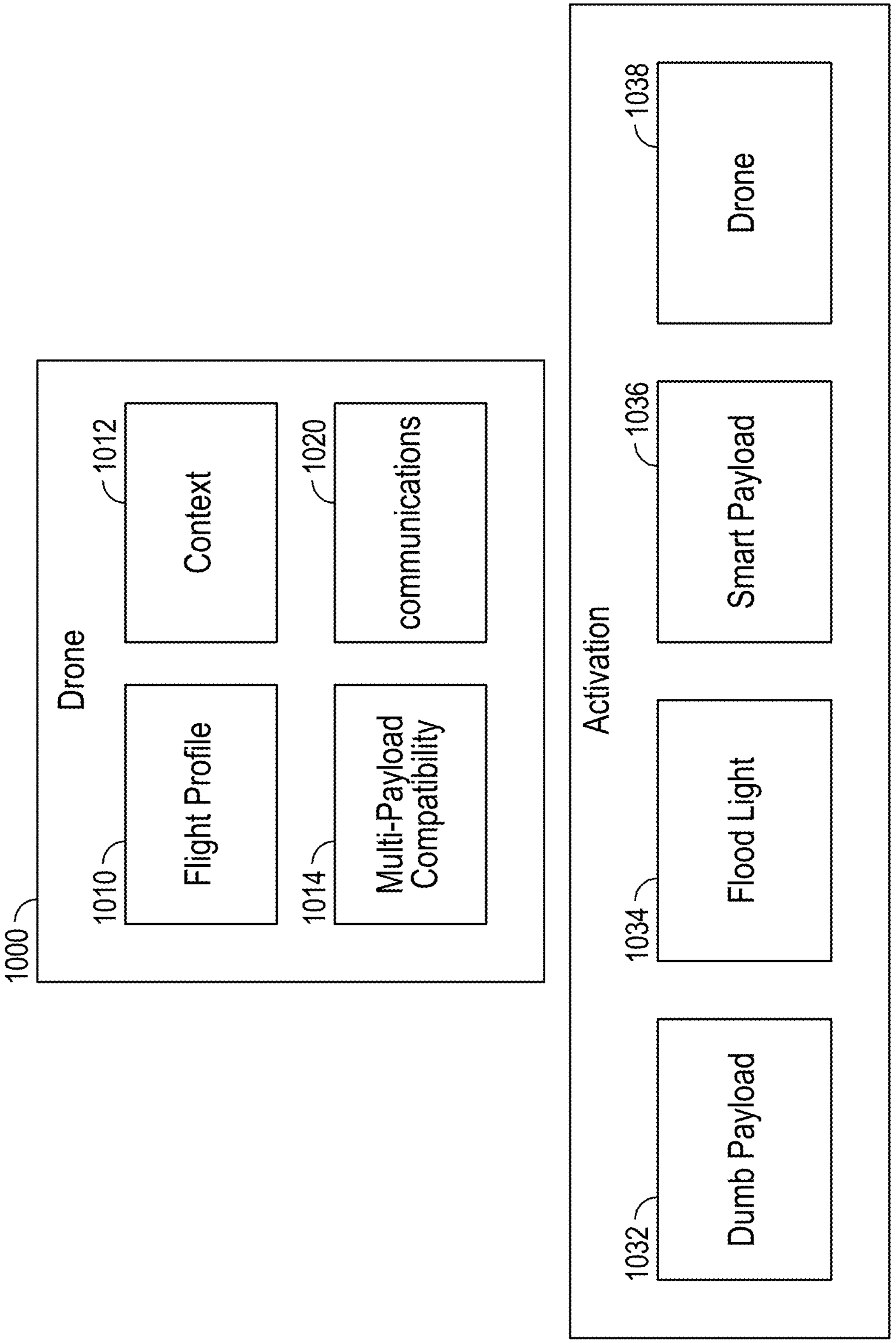
FIG. 10 is a block diagram illustrating a block diagram of a multi-payload compatibility in relation to activation capabilities, according to some embodiments of the present disclosure.

Referring now to FIG. 10, a multi-payload compatibility 1010 is depicted in block-diagram form in relation to activation 1030 capabilities, according to some embodiments of the present disclosure. A drone 1000 has on out-of-the box set of capabilities that are altered when a payload is attached. When a drone 1000 has a multi-payload compatibility, a compatibility in which multiple payload types may be carried by the drone, both the flight profile 1010 and context 1012 influence the laden-flight-profile capabilities. These laden-flight-profile capabilities inform how pilot-initiated commands are altered into the operating instructions by the payload manager. These operation instructions are important to manage when the context 1012 of the drone changes. Exemplary instances of a context change may be a shift from a lead-drone status to a "follower" state, as described with respect to FIG. 6. When a payload is attached to the drone, an activation 1030 may signal to the payload manager a need to update one or more of the flight profile 1010, the context 1012 of the drone, and the multi-payload compatibility 1014 most closely related with the activation 1030.

In one embodiment, the activation 1030 may include dumb payload 1032 (mechanical)—lighting fixture (flashlight, flood light) 1034, and a drone 1038 as router or network switch for relaying payload communications 1020 to ground control. The activation 1030 may also include a smart payload 1036 with some processing capability (microcontroller) to initiate receive operating instructions—e.g., camera (on/off), also default operation override if an error occurs (looking for render of a rail connector), CBRME sensor, RF jammer, cellular jammer, GPS jammer, or initiate a non-destructive-testing (NDT) capability of the payload.

Figure 11:
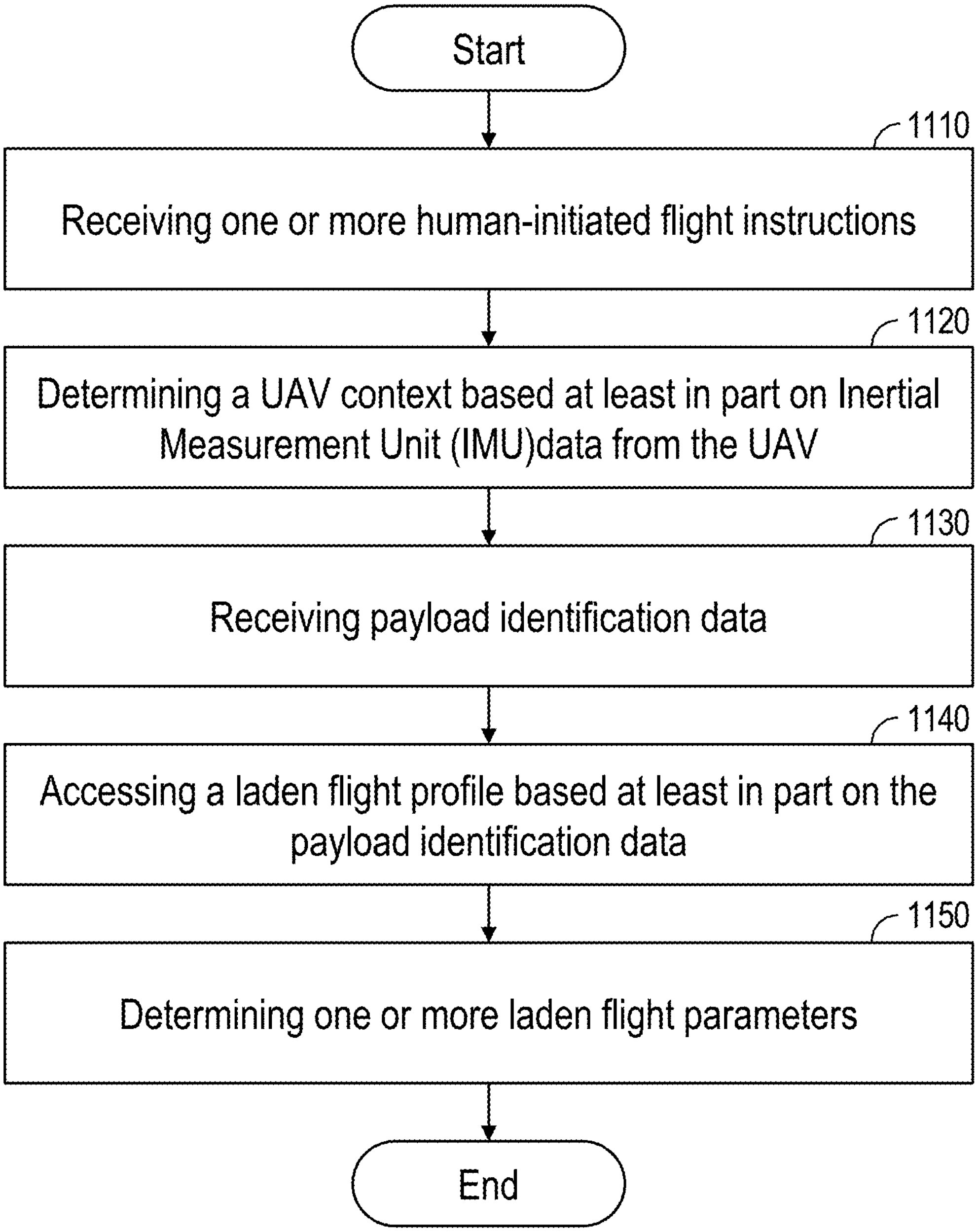
FIG. 11 is a flowchart illustrating a method for improving, or even optimizing, flight of an unmanned aerial vehicle, according to some embodiments of the present disclosure.

FIG. 11 is a flowchart that describes a method for improving, or even optimizing, flight of an unmanned aerial vehicle, according to some embodiments of the present disclosure. In some embodiments, at 1110, the method may include receiving one or more human-initiated flight instructions. At 1120, the method may include determining a UAV context based at least in part on Inertial Measurement Unit (IMU) data from the UAV. At 1130, the method may include receiving payload-identification data. At 1140, the method may include accessing a laden-flight profile based at least in part on the payload-identification data. At 1150, the method may include determining one or more laden-flight parameters. The one or more laden-flight parameters may be based at least in part on the one or more human-initiated flight instructions, the UAV context, and the laden-flight profile.

In some embodiments, there is a load-authentication sequence. The unmanned aerial vehicle (UAV) interrogates an attached smart payload with an authentication protocol based at least in part on the payload-identification data. In some embodiments, the unmanned aerial vehicle (UAV) confirms a mechanical connection between the unmanned aerial vehicle (UAV) and an attached payload, the confirmation comprising at least one of a visual confirmation of the mechanical connection, an electrical connection with the mechanical connection, a wireless connection between the unmanned aerial vehicle (UAV) and the attached payload, or a make/break connection.

In some embodiments, the unmanned aerial vehicle (UAV) interrogates an attached smart payload with a wireless protocol, a QR code, an optical reader, or an electrical connection. In some embodiments, there is a mechanical-load-attachment-verification sequence. The unmanned aerial vehicle (UAV) confirms a mechanical connection between the unmanned aerial vehicle (UAV) and an attached payload. In some embodiments, receiving a human-initiated flight instruction may comprise one or more of a flight-elevation instruction, a movement instruction, an acceleration instruction, a hover instruction, a banking instruction, a calibration instruction, a payload-engagement command, or a payload-disengagement command.

In some embodiments, receiving one or more human-initiated flight instructions may comprise a payload-arming command, an authentication request, or a weight-calibration command. In some embodiments, receiving one or more human-initiated flight instructions may comprise an automated-command sequence. In some embodiments, an automated-command sequence may comprise an object-recognition sequence, an obstacle collision-avoidance calculation, a pedestrian collision-avoidance calculation, or an environmental collision-avoidance calculation.

In some embodiments, a drone context may be one or more of a drone-operating status, or a system capability. In some embodiments, a drone context may be one or more of a payload-armed status, an authentication status, a group membership, a lead-drone status, a follower-drone status, a mission status, a mission objective, engagement in an automated command, a maintenance-alert status, a reduced operational capacity, a maximum range, and a battery-life status.

In some embodiments, a drone context may be one or more of an indoor/outdoor flight transition, an environmental low-visibility status, a high-wind status, an air-pollutant status, a chemical-presence status, a munitions status, a high-electromagnetic-radiation alert, a humidity status, a temperature-alert status, or a detected audible alert. Some embodiments include determining a drone context based at least in part on Inertial Measurement Unit (IMU) data from the UAV. The drone context may be a ground-truth reading. The Inertial Measurement Unit (IMU) attribute comprises using a neural network to filter the IMU dataset.

In some embodiments, an Inertial Measurement Unit (IMU) attribute may comprise data containing a linear acceleration ($a_x$, $a_y$, $a_z$) and an angular velocity ($\Omega_x$, $\Omega_y$, $\Omega_z$). A state estimate of one or more of a position, a velocity, and an orientation in a body frame and an inertial frame of the unmanned vehicle may be determined from the linear acceleration and the angular velocity of the received IMU attribute. In some embodiments, an Inertial Measurement Unit (IMU) attribute may be one or more of a yaw of the unmanned vehicle, a relative pose between two sequential moments, a 3D trajectory, and a ground-truth linear velocity, a target-tracking command, and a predicted linear-velocity vector ($V_x$, $V_y$, $V_z$). In some embodiments, the Inertial Measurement Unit (IMU) attribute may be based on one or more Inertial Measurement Unit sensors. In some embodiments, the Inertial Measurement Unit (IMU) attribute may be based on LIDAR data from an Inertial Measurement Unit.

Figure 12:
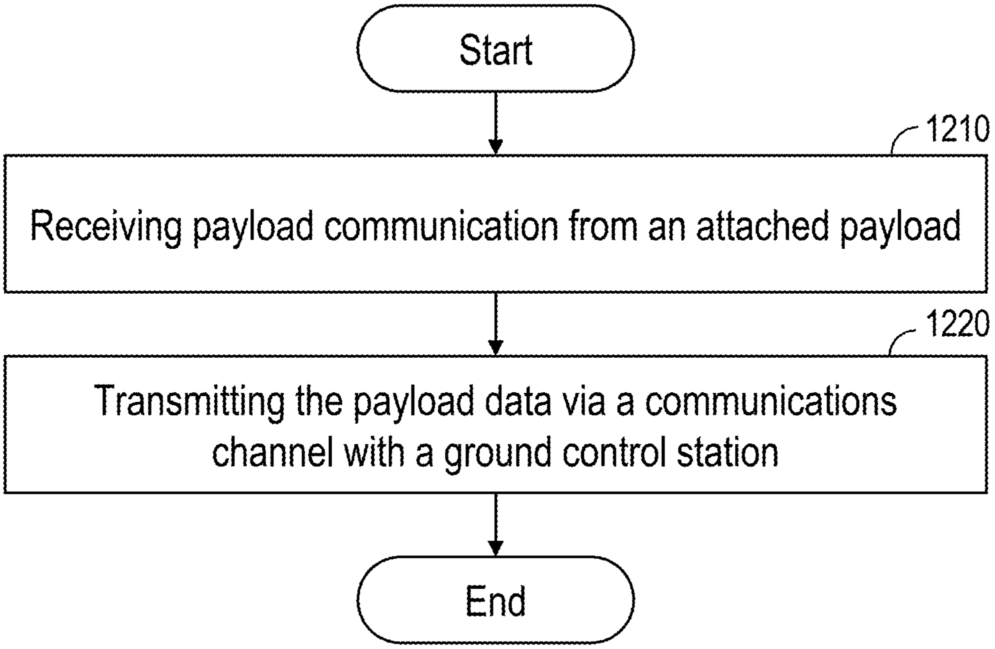
FIG. 12 is a flowchart further illustrating the method for improving, or even optimizing, flight of an unmanned aerial vehicle from FIG. 11, according to some embodiments of the present disclosure.

FIG. 12 is a flowchart that further describes the method for improving, or even optimizing, flight of an unmanned aerial vehicle from FIG. 11, according to some embodiments of the present disclosure. In some embodiments, in a load-verification sequence, the unmanned aerial vehicle (UAV) interrogates an attached smart payload with a verification protocol based at least in part on the payload-identification data. In some embodiments, a payload may send a communication protocol including receiving a payload communication from an attached payload 1210 and transmitting the payload data via a communications channel with a ground control station 1220.

Figure 13:
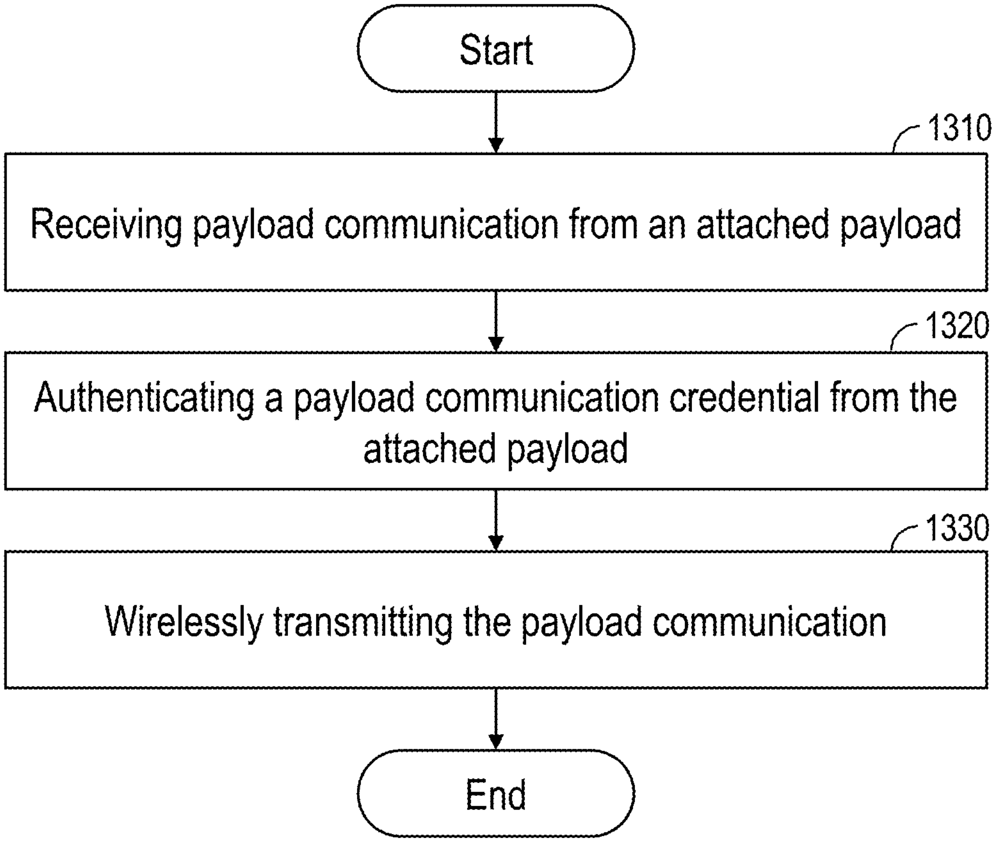
FIG. 13 is a flowchart further illustrating the method for improving, or even optimizing, flight of an unmanned aerial vehicle from FIG. 11, according to some embodiments of the present disclosure.

FIG. 13 is a flowchart that further describes the method for improving, or even optimizing, flight of an unmanned aerial vehicle from FIG. 11, according to some embodiments of the present disclosure. In some embodiments, at 1310, the method may include receiving a payload communication from an attached payload. At 1320, the method may include authenticating a payload-communication credential from the attached payload. At 1330, the method may include wirelessly transmitting the payload communication.

Referring now to FIG. 14, an illustration of a payload electromechanical harness 1400 and a payload electromechanical adapter 1410 is provided. In some embodiments, the payload electromechanical harness 1400 may form a continuous electrical connection from an unmanned vehicle port (not depicted) to a harness connector 1420, to a harness receiver 1430, and a receiver connector port 1440 to electrically connect the payload to the drone via an electrical connection 1450.

The payload weight, duration of the task, and environmental conditions may necessitate supporting the electrical connection 1450 with some form of mechanical connection. For example, the electromechanical harness may include slots 1460 and 1462 for accepting a first edge 1464 and second edge 1466 of the payload electromechanical adapter 1410. The electrical connection 1450 and friction fit provided by the joining of the harness receiver 1430 and the harness connector 1420 may be augmented by a spring-loaded quick-release mechanism 1467 that coincides with a hole 1468 for receiving a plunging end (not pictured) of the spring-loaded quick-release mechanism 1467 when the harness connector 1420 and harness receiver 1430 are joined. While an example mechanical connection has been provided, alternative connection systems for securing the payload to the drone have been contemplated. Non-limiting examples of connections include a magnetic connection, an induced magnetic connection, a bayonet connection, a Velcro™ connection, a chemical connection, a mechanical-grip connection, a hanger configuration, and the like.

Electromechanical connections 1450 compatible with a receiver connector port 1440 may have one or more of a transmit-data line (TxD), a receive-data line (RxD), a power port, a video port, one or more audio ports, a clock/data port, and a signal ground. Exemplary connection types include RS-232, HDMI, RJ45, DVI, and the like. Depending on the type of device and the application, an existing standard method of connection common to the industry may be used. For example connectors used in the automotive industry, aerospace, mining, and oil and gas may be readily accommodated by including a suitable receiver connector port to support one or more of powering the payload, communicating with the payload, controlling the payload, or relaying instructions from a remote Ground Control System to the payload (e.g., using the drone and electromechanical harness as a component of a drone as a router system). While the harness connector 1420 has been described in relation to a payload electromechanical adapter 1410, in some embodiments a payload may make a direct physical and electrical connection through a harness connector 1420.

Figure 15:
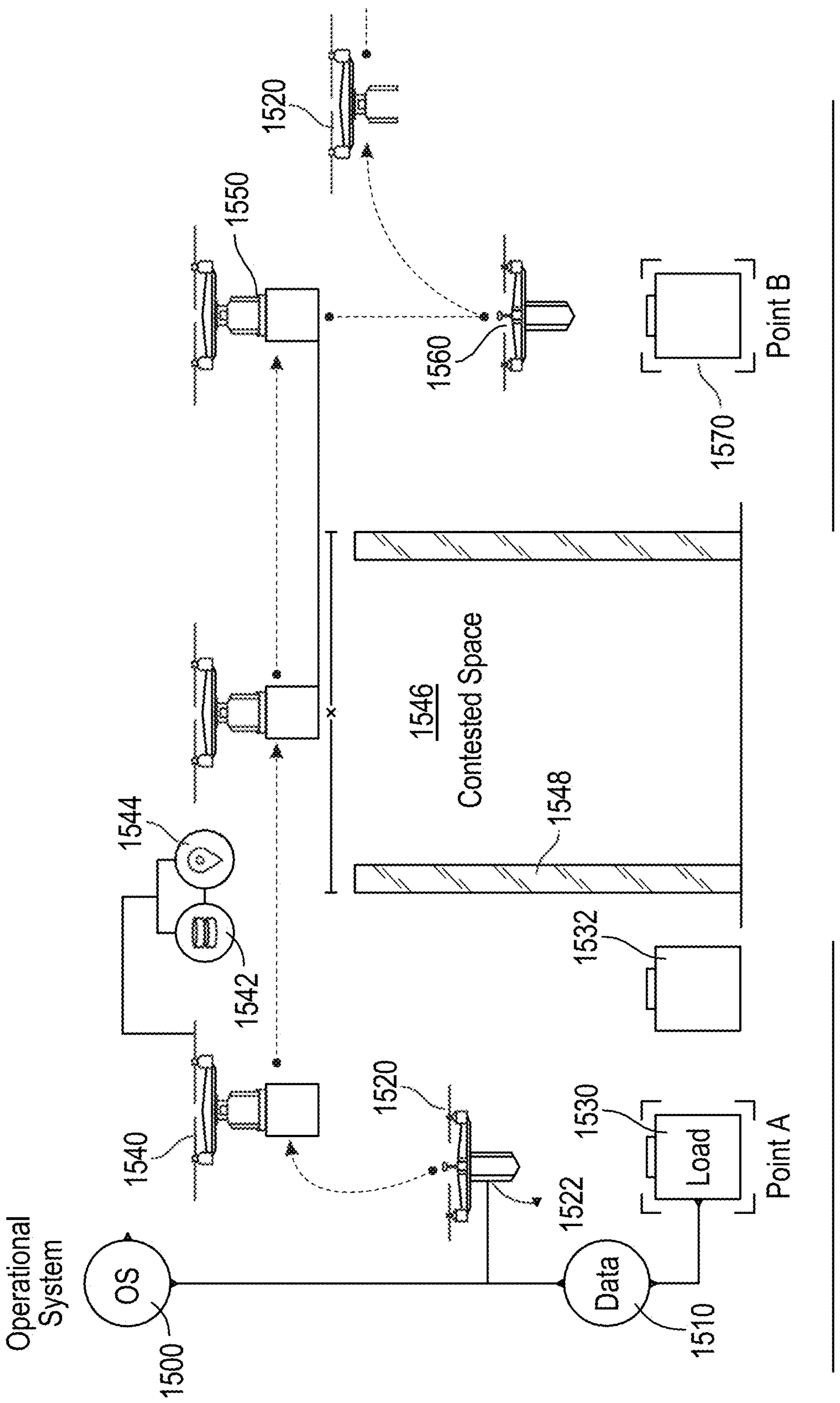
FIG. 15 illustrates a payload management system used to support the recognition of a payload, completion of a task, and interaction with a payload, in accordance with one or more embodiments of the present disclosure.

Referring now to FIG. 15, an exemplary embodiment of a remote-based payload-management system 1500 is provided. The payload manager system supports the transmission of task data 1510 to a “smart” payload 1530 and a drone 1520. In some embodiments, the data 1510 may be received at the drone 1520 and routed to the payload 1530 wirelessly or through the mechanical grip 1522. The smart payload 1530 may be any payload that includes a microprocessor and can receive instructions from at least one communication protocol compatible with the payload-management system 1500. The drone 1520 may be adapted with a mechanical adapter, for example a mechanical grip 1522, capable of transporting the payload 1530.

The data 1510 transmitted to the payload 1530 located at Point A may include a payload-specific mode, such as a security mode, that may support the drone 1520 in recognizing and authenticating the payload 1530. The security-mode data may include a security instruction, such as a one-time handshake the drone 1520 may use to distinguish the target payload 1530 from a similar payload 1532 at Point A. An example of visual techniques for recognizing the payload 1520 using computer-vision techniques are described above in the discussion of FIG. 2A and FIG. 2B. The data 1510 may also include instructions that instruct the target payload 1530 to identify itself, for example by emitting or pulsing a light in a sequence, or instructing a mobile payload to position itself at Point A. An example of an authentication instruction set contained within data 1510 is provided above in FIG. 5B, FIG. 5D, and FIG. 5E.

In some embodiments the data 1510 received by the payload may include a payload-specific mode, for example a communication mode to match a communication protocol used to wirelessly or hardwire communicate with the drone 1520. In some embodiments, the data 1510 may include other instruction sets based on the payload and task, for example the payload-specific modes 304 presented in FIG. 3. Instructions may be task related, with specific milestones in the task triggering instructions to be executed by the payload 1530. For example, a payload 1530 equipped with GPS, or able to receive GPS instructions from the drone 1520, may be used to "wake-up" from a battery-preserving mode upon leaving or arriving at a GPS coordinate, for example leaving Point A and achieving a height above ground. In some embodiments, a payload 1570 may be armed or otherwise activated upon recognizing the GPS coordinates or from a visual recognition of environmental attributes of Point B. In one embodiment, the data 1510 may include an instruction to activate the payload 1570 only when the drone 1560 has achieved a safe distance from the Point B location.

The data 1510 may also include instructions for sharing resources between the drone 1520 and the payload 1530. For example, the drone 1520 may receive instructions to shutdown on-board equipment in favor of using complimentary resources found on the payload. Resource-intensive capabilities, for example capabilities in terms of processing or battery consumption, might be shared. Shared capabilities might include parallel processing or load balancing the processing of tasks between the microcontroller of the drone 1520 and payload 1530, or the drone 1520 parasitically drawing down the payload's battery as opposed to the drone's own battery.

The payload-management system may send data 1510 to the drone 1520 about a task and mission to be conducted. The data 1510 may include instructions that support the remote pilot in executing the task, augmenting the pilot's capabilities. For example, the data 1510 may include visual data suitable for recognizing the payload 1530. The visual data may be used by the FPV camera of the drone 1520 to search for the object within the field of view, and support the pilot in making a safe approach to the drone at Point A; one example of this is described abovewith respect to FIG. 5C. In a further example, when the drone 1520 is accompanied on the task by a fleet of drones, the payload-management system 1500 may contain instructions in the data 1510 that assign specific roles, tasks, and flight profiles for a laden drone 1540 in the fleet and unladen drones 1520. The instructions may include safe flying distances, reduced task loading of an unladen drone 1520, and a flight mode. In some embodiments, reduced task loading may alter the drone's 1520 operational instruction set, allowing a drone to temporarily disable non-essential peripheral devices or modes, such as those depicted above in FIG. 7.

As depicted in FIG. 15, the laden drone 1540 may receive task data 1542 and destination data 1544. The task data 1542 may include an instruction set to ensure the new flight profile of the laden drone 1540 matches an expected flight profile once the laden drone 1540 has taken flight. One non-limiting example of such a protocol is described above in FIG. 5A. In another embodiment, the laden drone 1540 may execute a series of instructions to learn the new laden-flight profile of the laden drone 1540. The attributes of the laden-flight profile may be characterized to develop a rule set for safe piloting and transport of the load 1530 by the laden drone 1540. One such non-limiting example of a rule set is described above with regard to FIG. 8 and/or FIG. 9. Such a rule set may increase the likelihood, or ensure, that pilot commands do not violate the rule set. For example, a pilot who forgets the additional height added to the laden drone 1540 by the payload 1530 may approach a wall 1548 of a contested space 1546 at too low of an altitude to clear the wall 1548. The rule set within the data 1542 may be checked for compliance with an onboard altimeter to ensure an operation instruction sent by the pilot is automatically adjusted to ensure the minimum elevation of the rule set is complied with. In some embodiments, the data 1542 may activate evasive maneuvers to thwart surveillance, or when onboard systems of the drone 1540 detect an obstacle or threat, the drone 1540 may automatically engage in evasive maneuvers while the pilot navigates the drone from the wall 1548 to the destination at Point B.

Upon arriving at Point B, instructions contained within the data 1510 or 1542 may augment the pilot's ability to detach the payload 1570 from the drone 1560. The pilot may be assisted in activating a landing sequence for the drone 1550 upon receiving an instruction set from the pilot or upon being navigated to an arial checkpoint above Point B. Upon activating the landing sequence for the laden drone 1560, the on-board microcontroller of the drone may retrieve instructions from onboard memory containing the flight profile and/or operational instruction set to safely release the payload 1570 at Point B. In some embodiments, the drone 1550 may activate, wake-up, or otherwise arm the payload prior, during, or after releasing the payload at Point B.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having ordinary skill in the art will recognize that the state of the art has progressed to the point where there is little distinction left between hardware, software, and/or firmware implementations of aspects of systems; the use of hardware, software, and/or firmware is generally a design choice representing cost vs. efficiency trade-offs (but not always, in that in certain contexts the choice between hardware and software can become significant). Those having ordinary skill in the art will appreciate that there are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be affected, none of which is inherently superior to the other in that any vehicle to be utilized is a choice dependent upon the context in which the vehicle will be deployed and the specific concerns (e.g., speed, flexibility, or predictability) of the implementer, any of which may vary.

In some implementations described herein, logic and similar implementations may include software or other control structures suitable to operation. Electronic circuitry, for example, may manifest one or more paths of electrical current constructed and arranged to implement various logic functions as described herein. In some implementations, one or more medias are configured to bear a device-detectable implementation if such media hold or transmit a special-purpose-device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively, or additionally, in some variants, an implementation may include special-purpose hardware, software, firmware components, and/or general-purpose components executing or otherwise controlling special-purpose components. Specifications or other implementations may be transmitted by one or more instances of tangible or transitory transmission media as described herein, optionally by packet transmission or otherwise by passing through distributed media at various times.

Alternatively, or additionally, implementations may include executing a special-purpose instruction sequence or otherwise operating circuitry for enabling, triggering, coordinating, requesting, or otherwise causing one or more occurrences of any functional operations described above. In some variants, operational or other logical descriptions herein may be expressed directly as source code and compiled or otherwise expressed as an executable instruction sequence. In some contexts, for example, C++ or other code sequences can be compiled directly or otherwise implemented in high-level descriptor languages (e.g., a logic-synthesizable language, a hardware-description language, a hardware-design simulation, and/or other such similar modes of expression). Alternatively, or additionally, some or all of the logical expression may be manifested as a Verilog-type hardware description or other circuitry model before physical implementation in hardware, especially for basic operations or timing-critical applications. Those skilled in the art will recognize how to obtain, configure, improve or even optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those having ordinary skill in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a USB drive, a solid-state memory device, a hard-disk drive, a Compact Disc (CD), a Digital Video Disk (DVD), a digital tape, a computer memory, etc.; and a transmission-type medium such as a digital- and/or an analog-communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application-specific integrated circuit, electrical circuitry forming a general-purpose computing device configured by a computer program (e.g., a general-purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read-only, etc.)), and/or electrical circuitry forming a communications device (e.g., a modem, communications switch, optical-electrical equipment, etc.). Those having ordinary skill in the art will recognize that the subject matter described herein may be implemented in an analog or digital fashion or some combination thereof.

Those skilled in the art will recognize that at least a portion of the devices and/or processes described herein can be integrated into a data-processing system. Those having ordinary skill in the art will recognize that a data-processing system generally includes one or more of a system-unit housing, a video-display device, memory such as volatile or non-volatile memory, processors such as microprocessors or digital-signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data-processing system may be implemented utilizing suitable commercially available components, such as those typically found in data-computing/communication and/or network-computing/communication systems.

In certain cases, use of a system or method as disclosed and claimed herein may occur in a territory even if components are located outside the territory. For example, in a distributed-computing context, use of a distributed-computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific examples set forth and the accompanying discussion are intended to be representative of their more general classes. In general, use of any specific example is intended to be representative of its class, and the non-inclusion of specific components (e.g., operations), devices, and objects should not be taken to be limiting.

With respect to the use of substantially any plural and/or singular terms herein, those having ordinary skill in the art can translate from the plural to the singular or from the singular to the plural as is appropriate to the context or application. The various singular/plural permutations are not expressly set forth herein for sake of clarity.

The herein described subject matter sometimes illustrates different components contained within, or connected with, different other components. It is to be understood that such depicted architectures are presented merely as examples, and that in fact many other architectures may be implemented which achieve the same functionality. In a conceptual sense, any arrangement of components to achieve the same functionality is effectively "associated" such that the desired functionality is achieved. Therefore, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of "operably couplable" include but are not limited to physically mateable or physically interacting components, wirelessly interactable components, wirelessly interacting components, logically interacting components, or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" generally can encompass active-state components, inactive-state components, or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and, in the absence of such recitation, no such intent is present. For example, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such a recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having ordinary skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having ordinary skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented as sequences of operations, it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for operating an unmanned aerial vehicle (UAV), the system comprising:

a UAV ladened with multiple payloads having at least one smart payload;

a UAV microprocessor-based controller configured to receive information from the smart payload and configured to provide control signals for the UAV based on the information from the smart payload; and a payload adaptor configured to couple the smart payload to the UAV, the payload adaptor including a communications link between the smart payload and the UAV microprocessor-based controller;

wherein the information received from the smart payload comprises at least one payload-specific mode, and wherein the payload specific mode comprises at least one navigation mode, including at least one of a road-avoidance mode or a UAV avoidance mode.

2. The system of claim 1, wherein the at least one payload-specific mode comprises at least one virtual-reality (VR) mode, wherein the at least one virtual-reality (VR) mode includes at least one of a target-centric mode, a UAV-centric mode, a payload-centric mode, a camera-changing mode, an automatically changing view mode, a view-selection-user-interface (UI) mode, an interception mode, an end-game mode, a change-in-control-dynamics mode, a clear-display-but-for-marker mode, an edit-presets mode, or a changing-presets mode.

3. The system of claim 1, wherein the at least one payload-specific mode comprises at least one defense mode, the at least one defense mode including at least one of a camouflage mode, an evasion mode, an intercept mode, a counterattack mode, and a self-destruct mode.

4. The system of claim 3, wherein the payload-specific mode comprises at least one failure mode, including at least one of, a self-destruct mode, a drop-payload mode, an abort mode, an electromagnetic-pulse mode, a user-defined mode, and a programming-state mode.

5. A system for operating an unmanned aerial vehicle (UAV), the system comprising:

a UAV ladened with multiple payloads having at least one smart payload;

a UAV microprocessor-based controller configured to a) receive information from at least one communication circuit of the smart payload and b) provide control signals for the UAV based on the received information; and a payload adaptor including an electrical interconnect configured to couple with a payload electrical interconnect and configured to couple the smart payload to the UAV, the payload adaptor including a communications link from the smart payload to the UAV microprocessor-based controller;

wherein the information received from the smart payload comprises at least one payload-specific mode, and wherein the payload specific mode comprises at least one navigation mode, including at least one of a road-avoidance mode or a UAV avoidance mode.

6. The system of claim 5, wherein the UAV microprocessor-based controller is configured to interrogate the UAV-attached smart payload with a verification protocol based at least in part on payload-identification data received from the smart payload.

7. The system of claim 5, wherein the UAV microprocessor-based controller is configured to confirm a mechanical connection between the UAV and an attached smart, or dumb payload.

* * * * *